United States Patent
Kaplan et al.

(10) Patent No.: US 11,112,941 B2
(45) Date of Patent: Sep. 7, 2021

(54) CONTENT ITEM CREATION FROM DESKTOP TRAY

(71) Applicant: Dropbox, Inc., San Francisco, CA (US)

(72) Inventors: Joshua Kaplan, San Francisco, CA (US); Iris Lin, San Francisco, CA (US); Stanley Yeung, Oakland, CA (US); Cheechee Lin, San Francisco, CA (US); Graciela Kincaid, Seattle, WA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

(21) Appl. No.: 16/588,628

(22) Filed: Sep. 30, 2019

(65) Prior Publication Data

US 2020/0142549 A1    May 7, 2020

Related U.S. Application Data

(63) Continuation-in-part of application No. 16/582,361, filed on Sep. 25, 2019, now Pat. No. 10,664,319.

(60) Provisional application No. 62/756,367, filed on Nov. 6, 2018, provisional application No. 62/833,391, filed on Apr. 12, 2019.

(51) Int. Cl.
*G06F 3/0482* (2013.01)
*G06F 3/0484* (2013.01)

(52) U.S. Cl.
CPC .......... *G06F 3/0482* (2013.01); *G06F 3/0484* (2013.01)

(58) Field of Classification Search
CPC ..................................................... G06F 3/0482
USPC ........................................................ 715/779
See application file for complete search history.

(56) References Cited

U.S. PATENT DOCUMENTS

| | | | |
|---|---|---|---|
| 6,697,838 B1 * | 2/2004 | Jakobson | G06F 16/9535 709/203 |
| 6,828,992 B1 * | 12/2004 | Freeman | H04B 1/202 715/810 |
| 7,266,553 B1 * | 9/2007 | Anderson | G06F 16/48 |
| 7,386,535 B1 * | 6/2008 | Kalucha | G06Q 10/06 |
| 8,219,407 B1 * | 7/2012 | Roy | H04L 12/282 704/275 |
| 8,489,676 B1 * | 7/2013 | Chaplin | G06F 16/113 709/203 |

(Continued)

FOREIGN PATENT DOCUMENTS

WO    2016106088 A1    6/2016

OTHER PUBLICATIONS

Andrew, "What's new in Syncdocs 0.52", published May 19, 2011, available at <<https://www.syncdocs.com/2011/05/what's-new-in-syncdocs-0-52>>, 5 pages (Year: 2011).*

(Continued)

*Primary Examiner* — Daniel Rodriguez
(74) *Attorney, Agent, or Firm* — Polsinelli PC

(57) ABSTRACT

Systems and methods for creating content items are provided. In some examples, a method can include receiving a user selection of an interface element located in a persistent user interface of an operating system desktop of a client device, displaying, in response to the user selection of the interface element, a set of user options, the set of user options comprising a option to create a content item of a particular type, receiving a user selection of the option to create the content item, and initiating the creation of the content item.

18 Claims, 22 Drawing Sheets

(56) References Cited

U.S. PATENT DOCUMENTS

| | | | | |
|---|---|---|---|---|
| 8,595,642 | B1* | 11/2013 | Lagassey | G06F 3/048 715/781 |
| 9,251,114 | B1* | 2/2016 | Ancin | G06F 16/178 |
| 2002/0062397 | A1* | 5/2002 | Chang | G06Q 20/102 709/246 |
| 2002/0169650 | A1* | 11/2002 | Dougherty | G06Q 50/188 705/38 |
| 2004/0117839 | A1* | 6/2004 | Watson | H04L 65/80 725/87 |
| 2007/0005449 | A1* | 1/2007 | Mathew | G06F 16/958 705/26.1 |
| 2007/0050733 | A1* | 3/2007 | Lee | H04N 5/44543 715/825 |
| 2009/0043733 | A1* | 2/2009 | Kingsford | G06F 16/2228 |
| 2009/0158167 | A1* | 6/2009 | Wang | G06F 3/0482 715/745 |
| 2010/0251175 | A1* | 9/2010 | Brunkhorst | G06F 3/0485 715/811 |
| 2011/0301982 | A1* | 12/2011 | Green, Jr. | G06Q 10/06 705/3 |
| 2013/0110903 | A1* | 5/2013 | Myerscough | H04L 67/28 709/203 |
| 2013/0285893 | A1* | 10/2013 | Hanes | G06Q 50/01 345/156 |
| 2013/0325822 | A1* | 12/2013 | Sambamurthy | G06F 16/93 707/694 |
| 2014/0019498 | A1* | 1/2014 | Cidon | G06F 16/10 707/827 |
| 2014/0101310 | A1* | 4/2014 | Savage | H04L 43/00 709/224 |
| 2014/0122592 | A1* | 5/2014 | Houston | H04L 29/06 709/204 |
| 2014/0181153 | A1* | 6/2014 | Moore | H04L 41/50 707/803 |
| 2014/0229839 | A1* | 8/2014 | Lynch | G06F 16/93 715/736 |
| 2014/0358882 | A1* | 12/2014 | Diab | G06F 16/532 707/707 |
| 2015/0365497 | A1* | 12/2015 | Zhao | H04L 69/24 709/220 |
| 2016/0062839 | A1* | 3/2016 | Kapoor | G06F 16/162 707/684 |
| 2016/0259413 | A1* | 9/2016 | Anzures | G06T 13/80 |
| 2017/0315790 | A1* | 11/2017 | Samatov | G06F 8/61 |
| 2018/0150477 | A1* | 5/2018 | Jewell | G06F 16/128 |
| 2018/0349408 | A1* | 12/2018 | Jewell | G06F 16/1734 |
| 2019/0339843 | A1* | 11/2019 | Yost | G06F 9/54 |
| 2020/0143074 | A1* | 5/2020 | Steinberg | H04L 67/1097 |

OTHER PUBLICATIONS

Metactrl.com, "Google Drive: Multiple Files with the Same Path", available at <<https://metactrl.com/docs/gdrive-same-path/>>, archived on Jun. 19, 2016 at http://web.archive.org, 4 pages (Year: 2016).*
Communication pursuant to Rules 161(1) and 162 EPC for European application No. 19805433.0 dated Mar. 3, 2021, 16 pages.

* cited by examiner

CONTENT ITEM CREATION FROM DESKTOP TRAY

CROSS-REFERENCE TO RELATED APPLICATIONS

This application claims the benefit of, and priority to, U.S. Provisional Patent Application No. 62/756,367 filed on Nov. 6, 2018, entitled "TECHNOLOGIES FOR INTEGRATING CLOUD-BASED DOCUMENTS ACROSS PLATFORMS" and U.S. Provisional Patent Application No. 62/833,391 filed on Apr. 12, 2019, entitled "CONTENT ITEM CREATION FROM DESKTOP TRAY" and is a continuation-in-part of U.S. application Ser. No. 16/582,361 filed on Sep. 25, 2019, entitled "TECHNOLOGIES FOR INTEGRATING CLOUD CONTENT ITEMS ACROSS PLATFORMS," the contents of which are hereby expressly incorporated by reference in their entirety.

TECHNICAL FIELD

The present technology relates to user interfaces and the creation of digital content items.

BACKGROUND

Content items are typically created on a client device by a user locating an application associated with the content item, opening that application, and navigating menus or other interface components of the application to the location where the user can trigger an interface element configured to create the content item. Often, this process may also involve navigating the operating system interface (e.g., nested folders in a file system, start menu interfaces, launch pad interfaces, finder interfaces, search interfaces, etc.) on the client device to find the application that the user wants to launch and having to wait for the application to load.

Content management systems allow users to store and access data on the cloud. A content management system can allow users to maintain a variety of content items stored on, and accessible from, the content management system. Some content management systems allow users to share data with other users and access the data in a collaborative fashion. Moreover, some content management systems may also support synchronization of copies of data across a number of client devices and servers so each copy of the data is identical and locally accessible from the client devices. The synchronization functionality can enable users to store local copies of the data on their client devices and access the local copies of the data from their client devices. The local copies of the data can be synchronized with the data on the content management systems to ensure consistency between local and cloud copies of the data. The local copies of the data may provide users with faster access to the data and may allow users to access the data when their client devices are offline.

To create a content item on a content management system, users may use a web interface or an application running on the client device that is associated with the content management system. For example, a user can locate a web browser application, launch and wait for the web browser to open, navigate to a website associated with the content management system, sign in to the website, locate an interface element on the website that creates the content item, and select the interface element. Using an application on the client device to create a cloud content item has some similarities to the typical content item creation process in that a user is still required to open the application and navigate to an interface element configured to create the cloud doc on the cloud service.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Figure 1A:
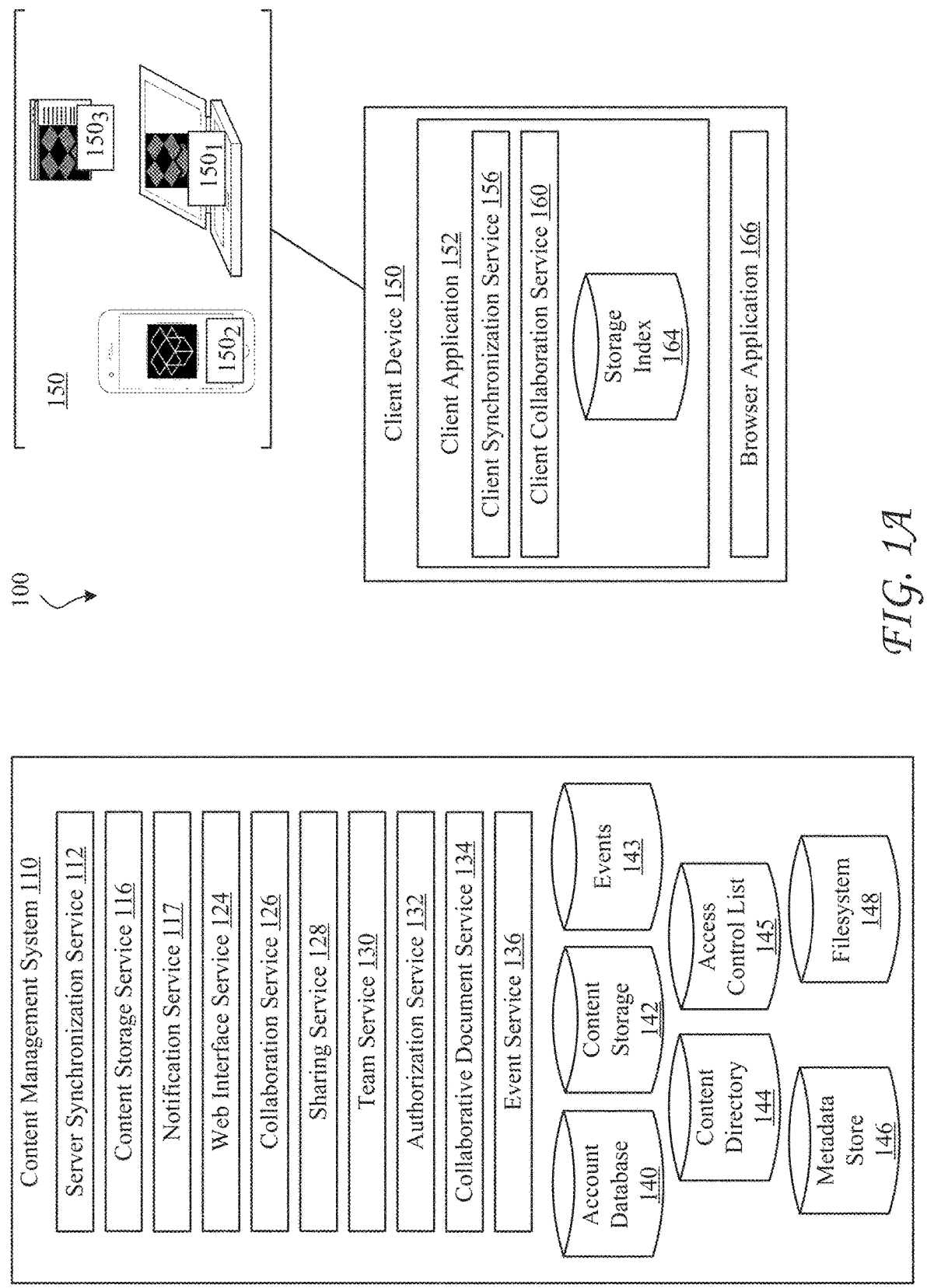
FIG. 1A shows an example configuration of a computing environment including a content management system and client devices.

Various examples of the present technology are discussed in detail below. While specific implementations are discussed, it should be understood that this is done for illustration purposes only. A person skilled in the relevant art will recognize that other components and configurations may be used without parting from the spirit and scope of the present technology.

As noted above, although there are various ways of creating content items on a client device or on a content management system, doing so involves a number of steps, searching for and navigating through the right interface elements and waiting for applications (e.g., a web browser or native application running on a client device) to open. The path(s) a user traces during this process may also take the user across large swaths of a display interface which, with large modern displays, may be suboptimal.

Aspects of the subject technology provide an improved user interface and user experience by allowing a user to create a content item from a persistent user interface located on an operating system desktop of a client device. The persistent user interface may be, for example, a system tray for a version of the Microsoft Windows operating system or Linux operating system or a menu bar for a version of the Macintosh operating system (e.g., Mac OS). The persistent user interface may include an interface element (e.g., an icon) that, when selected by a user, provides the user with options to create a content item.

By providing the content item creation interface on the persistent user interface on the operating system desktop, a user is able to create content items more directly with fewer steps, less time (e.g., time locating the correct interface elements, time waiting for an application to load, etc.), and/or less distance traversed across the desktop interface.

Furthermore, as is discussed in further detail throughout, there is increasing use of various local and cloud-based content items and applications from different content management systems. Various aspects of the subject technology provide an integrated and unified solution that addresses or overcomes various technical problems and limitations. For example, the content item creation interface may provide options to create different types of content items that may be associated with different applications and/or cloud services (e.g., cloud storage systems or other content management systems). As a result, a user may be able to go to the same content item creation interface at a familiar location to create different types of content items instead of having the search, navigate, open, wait, and locate creation interface elements in multiple different applications or websites.

Content management systems allow users to store and access content items across multiple devices. The content items may include, but are not limited to, files, documents, messages (e.g., email messages or text messages), media files (e.g., photos, videos, and audio files), folders, or any other unit of content. Content items may be shared with multiple users, edited, deleted, added, renamed, moved and/or otherwise accessed or manipulated. However, in many cases, a single content management system or solution may not be capable of representing, rendering, and/or managing cloud-based documents created by specific cloud-based applications hosted by different cloud-based document services or providers. As a result, users often store and access such documents from different cloud storage and content systems, while maintaining and accessing other content items on separate content management systems.

Moreover, the increasing use of cloud-based documents and applications from different cloud-based document services and the lacking or limited support for such documents by a single storage solution have created an explosion of content that's increasingly scattered across different systems and devices. The scattered nature of a user's content can significantly hamper the user's ability to organize the content, gain uniform or complete access to the content and associated functionalities from a single content management system, and collaborate with other users. These issues can quickly multiply as users attempt to collaborate with more users and implement a growing variety of cloud-based documents and applications, often causing content silos that are extremely difficult to manage.

Various other technologies described herein can also provide an integrated and unified solution that addresses or overcomes the foregoing and other technical problems and limitations. For example, the technologies herein can provide a cloud storage solution that is capable of organizing, representing and rendering cloud-based documents from a wide variety of cloud-based applications or services while maintaining support for the various cloud-backed functionalities associated with such cloud-based documents. In some cases, the cloud storage solution herein can also extend the functionalities or features of such cloud-based documents to include additional functionalities or features provided by the cloud storage solution herein, such as sharing, organization, collaboration, and security functionalities or features.

Various aspects of the disclosed technologies are deployed in the context of one or more content management systems, such as a cloud storage service, having content item synchronization capabilities and collaboration features, among others. An example configuration 100 of a content management system and environment is shown in FIG. 1A, which depicts content management system 110 interacting with client device 150.

Accounts

Content management system 110 can store content items in association with accounts, as well as perform a variety of content item management tasks, such as retrieve, modify, browse, and/or share the content item(s). Furthermore, content management system 110 can enable an account to access content item(s) from multiple client devices.

Content management system 110 supports a plurality of accounts. An entity (user, group of users, team, company, etc.) can create an account with content management system, and account details can be stored in account database 140. Account database 140 can store profile information for registered entities. In some cases, profile information for registered entities includes a username and/or email address. Account database 140 can include account management information, such as account type (e.g. various tiers of free or paid accounts), storage space allocated, storage space used, client devices 150 having a registered content management client application 152 resident thereon, security settings, personal configuration settings, etc.

Account database 140 can store groups of accounts associated with an entity. Groups can have permissions based on group policies and/or access control lists, and members of the groups can inherit the permissions. For example, a marketing group can have access to one set of content items while an engineering group can have access to another set of content items. An administrator group can modify groups, modify user accounts, etc.

Content Item Storage

A feature of content management system 110 is the storage of content items, which can be stored in content storage 142. Content items can be any digital data such as documents, collaboration content items, text files, audio files, image files, video files, webpages, executable files, binary files, etc. A content item can also include collections or other mechanisms for grouping content items together with different behaviors, such as folders, zip files, playlists, albums, etc. A collection can refer to a folder, or a plurality of content items that are related or grouped by a common attribute. In some embodiments, content storage 142 is combined with other types of storage or databases to handle specific functions. Content storage 142 can store content items, while metadata regarding the content items or objects associated with the content items or user accounts can be stored in metadata store 146. Likewise, data regarding where a content item is stored in content storage 142 can be stored in content directory 144. Additionally, data regarding changes, access, etc., can be stored in filesystem 148.

Each of the various storages/databases such as content storage 142, content directory 144, filesystem 148, and metadata store 146 can be comprised of more than one such storage or database and can be distributed over many devices and locations. Other configurations are also possible. For example, data from content storage 142, content directory 144, filesystem 148, and/or metadata store 146 may be combined into one or more content storages or databases or further segmented into additional content storages or databases. Thus, content management system 110 may include more or less storages and/or databases than shown in FIG. 1A.

In some embodiments, content storage 142 is associated with at least one content storage service 116, which includes software or other processor executable instructions for managing the storage of content items including, but not limited to, receiving content items for storage, preparing content items for storage, selecting a storage location for the content item, retrieving content items from storage, etc. In some embodiments, content storage service 116 can divide a content item into smaller chunks for storage at content storage 142. The location of each chunk making up a content item can be recorded in content directory 144. Content directory 144 can include a content entry for each content item stored in content storage 142. The content entry can be associated with a unique ID, which identifies a content item.

In some embodiments, the unique ID, which identifies a content item in content directory 144, can be derived from a deterministic hash function. This method of deriving a unique ID for a content item can ensure that content item duplicates are recognized as such since the deterministic hash function will output the same identifier for every copy of the same content item, but will output a different identifier for a different content item. Using this methodology, content storage service 116 can output a unique ID for each content item.

Content storage service 116 can also designate or record a content path for a content item in metadata store 146. The content path can include the name of the content item and/or folder hierarchy associated with the content item. For example, the content path can include a folder or path of folders in which the content item is stored in a local file system on a client device. While content items are stored in content storage 142 in blocks and may not be stored under a tree like directory structure, such directory structure is a comfortable navigation structure for users. Content storage service 116 can define or record a content path for a content item wherein the "root" node of a directory structure can be a namespace for each account. Within the namespace can be a directory structure defined by a user of an account and/or content storage service 116. Metadata store 146 can store the content path for each content item as part of a content entry.

In some embodiments the namespace can include additional namespaces nested in the directory structure as if they are stored within the root node. This can occur when an account has access to a shared collection. Shared collections can be assigned their own namespace within content management system 110. While some shared collections are actually a root node for the shared collection, they are located subordinate to the account namespace in the directory structure, and can appear as a folder within a folder for the account. As addressed above, the directory structure is merely a comfortable navigation structure for users, but does not correlate to storage locations of content items in content storage 142.

While the directory structure in which an account views content items does not correlate to storage locations at content management system 110, the directory structure can correlate to storage locations on client device 150 depending on the file system used by client device 150.

As addressed above, a content entry in content directory 144 can also include the location of each chunk making up a content item. More specifically, the content entry can include content pointers that identify the location in content storage 142 of the chunks that make up the content item.

In addition to a content path and content pointer, a content entry in content directory 144 can also include a user account identifier that identifies the user account that has access to the content item and/or a group identifier that identifies a group with access to the content item and/or a namespace to which the content entry belongs.

Content storage service 116 can decrease the amount of storage space required by identifying duplicate content items or duplicate blocks that make up a content item or versions of a content item. Instead of storing multiple copies, content storage 142 can store a single copy of the content item or block of the content item and content directory 144 can include a pointer or other mechanism to link the duplicates to the single copy.

Content storage service 116 can also store metadata describing content items, content item types, folders, file path, and/or the relationship of content items to various accounts, collections, or groups in metadata store 146, in association with the unique ID of the content item.

Content storage service 116 can also store a log of data regarding changes, access, etc., in filesystem 148. Filesystem 148 can include the unique ID of the content item and a description of the change or access action along with a time stamp or version number and any other relevant data. Filesystem 148 can also include pointers to blocks affected by the change or content item access. Content storage service can provide the ability to undo operations, by using a content item version control that tracks changes to content items, different versions of content items (including diverging version trees), and a change history that can be acquired from the filesystem 148.

Content Item Synchronization

Another feature of content management system 110 is synchronization of content items with at least one client device 150. Client device(s) can take different forms and have different capabilities. For example, client device $150_1$ is a computing device having a local file system accessible by multiple applications resident thereon. Client device $150_2$ is a computing device wherein content items are only accessible to a specific application or by permission given by the specific application, and the content items are typically stored either in an application specific space or in the cloud. Client device $150_3$ is any client device accessing content management system 110 via a web browser and accessing content items via a web interface. While example client devices $150_1$, $150_2$, and $150_3$ are depicted in form factors such as a laptop, mobile device, or web browser, it should be understood that the descriptions thereof are not limited to devices of these example form factors. For example a mobile device such as client $150_2$ might have a local file system accessible by multiple applications resident thereon, or client $150_2$ might access content management system 110 via a web browser. As such, the form factor should not be considered limiting when considering client 150's capabilities. One or more functions described herein with respect to client device 150 may or may not be available on every client device depending on the specific capabilities of the device—the file access model being one such capability.

In many embodiments, client devices are associated with an account of content management system 110, but in some embodiments client devices can access content using shared links and do not require an account.

As noted above, some client devices can access content management system 110 using a browser application 166, such as a web browser. For example, client device 150 can use browser application 166 to access web pages and content on content management system 110. However, client devices can also access content management system 110 using client application 152 stored and running on client device 150. Client application 152 can include a client synchronization service 156. Client synchronization service 156 can be in communication with server synchronization service 112 to synchronize changes to content items between client device 150 and content management system 110.

Client device 150 can synchronize content with content management system 110 via client synchronization service 156. The synchronization can be platform agnostic. That is, content can be synchronized across multiple client devices of varying type, capabilities, operating systems, etc. Client synchronization service 156 can synchronize any changes (new, deleted, modified, copied, or moved content items) to content items in a designated location of a file system of client device 150.

Content items can be synchronized from client device 150 to content management system 110, and vice versa. In embodiments wherein synchronization is from client device 150 to content management system 110, a user can manipulate content items directly from the file system of client device 150, while client synchronization service 156 can monitor directory on client device 150 for changes to files within the monitored folders.

When client synchronization service 156 detects a write, move, copy, or delete of content in a directory that it monitors, client synchronization service 156 can synchronize the changes to content management system service 116. In some embodiments, client synchronization service 156 can perform some functions of content management system service 116 including functions addressed above such as dividing the content item into blocks, hashing the content item to generate a unique identifier, etc. Client synchronization service 156 can index content within client storage index 164 and save the result in storage index 164. Indexing can include storing paths plus a unique server identifier, and a unique client identifier for each content item. In some embodiments, client synchronization service 156 learns the unique server identifier from server synchronization service 112, and learns the unique client identifier from the operating system of client device 150.

Client synchronization service 156 can use storage index 164 to facilitate the synchronization of at least a portion of the content within client storage with content associated with a user account on content management system 110. For example, client synchronization service 156 can compare storage index 164 with content management system 110 and detect differences between content on client storage and content associated with a user account on content management system 110. Client synchronization service 156 can then attempt to reconcile differences by uploading, downloading, modifying, and deleting content on client storage as appropriate. Content storage service 116 can store the changed or new block for the content item and update filesystem 148, metadata store 146, content directory 144, content storage 142, account database 140, etc. as appropriate.

When synchronizing from content management system 110 to client device 150, a mount, modification, addition, deletion, move of a content item recorded in filesystem 148 can trigger a notification to be sent to client device 150 using notification service 117. When client device 150 is informed of the change a request changes listed in filesystem 148 since the last synchronization point known to the client device. When client device 150 determines that it is out of synchronization with content management system 110, client synchronization service 156 requests content item blocks including the changes, and updates its local copy of the changed content items.

In some embodiments, storage index 164 stores tree data structures wherein one tree reflects the latest representation of a directory according to server synchronization service 112, while another tree reflects the latest representation of the directory according to client synchronization service 156. Client synchronization service can work to ensure that the tree structures match by requesting data from server synchronization service 112 or committing changes on client device 150 to content management system 110.

Sometimes client device 150 might not have a network connection available. In this scenario, client synchronization service 156 can monitor the linked collection for content item changes and queue those changes for later synchronization to content management system 110 when a network connection is available. Similarly, a user can manually start, stop, pause, or resume synchronization with content management system 110.

Client synchronization service 156 can synchronize all content associated with a particular user account on content management system 110. Alternatively, client synchronization service 156 can selectively synchronize a portion of the content of the total content associated with the particular user account on content management system 110. Selectively synchronizing only a portion of the content can preserve space on client device 150 and save bandwidth.

In some embodiments, client synchronization service 156 selectively stores a portion of the content associated with the particular user account and stores placeholder content items in client storage for the remainder portion of the content. For example, client synchronization service 156 can store a placeholder content item that has the same filename, path, extension, metadata, of its respective complete content item on content management system 110, but lacking the data of the complete content item. The placeholder content item can be a few bytes or less in size while the respective complete content item might be significantly larger. After client device 150 attempts to access the content item, client synchronization service 156 can retrieve the data of the content item from content management system 110 and provide the complete content item to accessing client device 150. This approach can provide significant space and bandwidth savings while still providing full access to a user's content on content management system 110.

Collaboration Features

Another feature of content management system 110 is to facilitate collaboration between users. Collaboration features include content item sharing, commenting on content items, co-working on content items, instant messaging, providing presence and seen state information regarding content items, etc.

Sharing

Content management system 110 can manage sharing content via sharing service 128. Sharing content by providing a link to the content can include making the content item accessible from any computing device in network communication with content management system 110. However, in some embodiments a link can be associated with access restrictions enforced by content management system 110 and access control list 145. Sharing content can also include linking content using sharing service 128 to share content within content management system 110 with at least one additional user account (in addition to the original user account associated with the content item) so that each user account has access to the content item. The additional user account can gain access to the content by accepting the content, which will then be accessible through either web interface service 124 or directly from within the directory structure associated with their account on client device 150. The sharing can be performed in a platform agnostic manner. That is, the content can be shared across multiple client devices 150 of varying type, capabilities, operating systems, etc. The content can also be shared across varying types of user accounts.

To share a content item within content management system 110 sharing service 128 can add a user account identifier or multiple user account identifiers to a content entry in access control list database 145 associated with the content item, thus granting the added user account access to the content item. Sharing service 128 can also remove user account identifiers from a content entry to restrict a user account's access to the content item. Sharing service 128 can record content item identifiers, user account identifiers given access to a content item, and access levels in access control list database 145. For example, in some embodiments, user account identifiers associated with a single content entry can specify different permissions for respective user account identifiers with respect to the associated content item.

To share content items outside of content management system 110, sharing service 128 can generate a custom network address, such as a uniform resource locator (URL), which allows any web browser to access the content item or collection in content management system 110 without any authentication. To accomplish this, sharing service 128 can include content identification data in the generated URL, which can later be used to properly identify and return the requested content item. For example, sharing service 128 can include the account identifier and the content path or a content item identifying code in the generated URL. Upon selection of the URL, the content identification data included in the URL can be transmitted to content management system 110, which can use the received content identification data to identify the appropriate content item and return the content item.

In addition to generating the URL, sharing service 128 can also be configured to record in access control list database 145 that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing service 128 can change the value of the flag to 1 or true after generating a URL to the content item.

In some embodiments, sharing service 128 can associate a set of permissions to a URL for a content item. For example, if a user attempts to access the content item via the URL, sharing service 128 can provide a limited set of permissions for the content item. Examples of limited permissions include restrictions that the user cannot download the content item, save the content item copy the content item, modify the content item etc. In some embodiments, limited permissions include restrictions that only permit a content item to be accessed from with a specified domain, i.e., from within a corporate network domain, or by accounts associated with a specified domain, e.g., accounts associated with a company account (e.g., @acme.com).

In some embodiments, sharing service 128 can also be configured to deactivate a generated URL. For example, each content entry can also include a URL active flag indicating whether the content should be returned in response to a request from the generated URL. For example, sharing service 128 can only return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL. Likewise, sharing service 128 can reactivate the URL by again changing the value of the URL active flag to 1 or true. A user can thus easily restore access to the content item without the need to generate a new URL.

In some embodiments, content management system 110 can designate a URL for uploading a content item. For example, a first user with a user account can request such a URL, provide the URL to a contributing user and the contributing user can upload a content item to the first user's user account using the URL.

Events

Content management system 110 can track, create, and store events involving content items and/or user activity. For example, when a user interacts with a content item (e.g., add, edit, post, share, delete, comment, move, rename, etc.) and/or interacts with another user (e.g., message, comment, collaborate, etc.), event service 136 can generate an event for such interaction. When event service 136 detects a user interaction with a content item and/or another user, event service 136 can create an event identifier (e.g., unique event identifier) and event type, and associate the event identifier and event type with the user (e.g., user identifier and namespace identifier) to create an event or event record for the interaction. After the event is created, event service 136 can send the event identifier and any information associated with the event to events store 143 for storage.

Events store 143 can include one or more storage systems, such as one or more databases, for storing events and associated information. In some examples, events store 143 can include a distributed database or distributed storage system. Events store 143 can receive and store the event data for access by content management system 110.

Team Service

In some embodiments content management system 110 includes team service 130. Team service 130 can provide functionality for creating and managing defined teams of user accounts. Teams can be created for a company, with sub-teams (e.g., business units, or project teams, etc.), and user accounts assigned to teams and sub-teams, or teams can be created for any defined group of user accounts. Teams service 130 can provide a common shared space for the team, private user account folders, and access limited shared folders. Teams service can also provide a management interface for an administrator to manage collections and content items within team, and can manage user accounts that are associated with the team.

Authorization Service

In some embodiments, content management system 110 includes authorization service 132. Authorization service 132 ensures that a user account attempting to access a namespace has appropriate rights to access the namespace. Authorization service 132 can receive a token from client application 152 that follows a request to access a namespace and can return the capabilities permitted to the user account. For user accounts with multiple levels of access (e.g. a user account with user rights and administrator rights) authorization service 132 can also require explicit privilege escalation to avoid unintentional actions by administrators.

Presence and Seen State

In some embodiments, content management system can provide information about how users with which a content item is shared are interacting or have interacted with the content item. In some embodiments, content management system 110 can report that a user with which a content item is shared is currently viewing the content item. For example, client collaboration service 160 can notify notifications service 117 when client device 150 is accessing the content item. Notifications service 117 can then notify all client devices of other users having access to the same content item of the presence of the user of client device 150 with respect to the content item. Content management system 110 (e.g., via event service 136) and/or client device 150 can track user interactions with content, such as read or write events, and maintain a history of such events and interactions for a user (e.g., events store 143).

In some embodiments, content management system 110 can report a history of user interaction with a shared content item. Collaboration service 126 can query data sources such as events store 143, metadata store 146 and filesystem 148 to determine that a user has saved the content item, that a user has yet to view the content item, etc., and disseminate this status information using notification service 117 to other users so that they can know who currently is or has viewed or modified the content item.

Collaboration service 126 can facilitate comments associated with content, even if a content item does not natively support commenting functionality. Such comments can be stored in metadata store 146.

Collaboration service 126 can originate and transmit notifications for users. For example, a user can mention another user in a comment and collaboration service 126 can send a notification to that user that he has been mentioned in the comment. Various other content item events can trigger notifications, including deleting a content item, sharing a content item, etc.

Collaboration service 126 can provide a messaging platform whereby users can send and receive instant messages, voice calls, emails, etc.

Collaboration Content Items

In some embodiments content management service can also include Collaborative document service 134 which can provide an interactive content item collaboration platform whereby users can simultaneously create collaboration content items, comment in the collaboration content items, and manage tasks within the collaboration content items. Collaboration content items can be files that users can create and edit using a collaboration content item editor, and can contain collaboration content item elements. Collaboration content item elements may include a collaboration content item identifier, one or more author identifiers, collaboration content item text, collaboration content item attributes, interaction information, comments, sharing users, etc. Collaboration content item elements can be stored as database entities, which allows for searching and retrieving the collaboration content items. Multiple users may access, view, edit, and collaborate on collaboration content items at the same time or at different times. In some embodiments this can be managed by requiring two users access a content item through a web interface and there they can work on the same copy of the content item at the same time.

Collaboration Companion Interface

In some embodiments client collaboration service 160 can provide a native application companion interface for the purpose of displaying information relevant to a content item being presented on client device 150. In embodiments wherein a content item is accessed by a native application stored and executed on client device 150, where the content item is in a designated location of the file system of client device 150 such that the content item is managed by content application 152, the native application may not provide any native way to display the above addressed collaboration data. In such embodiments, client collaboration service 160 can detect that a user has opened a content item, and can provide an overlay with additional information for the content item, such as collaboration data. For example, the additional information can include comments for the content item, status of the content item, activity of other users previously or currently viewing the content item. Such an overlay can warn a user that changes might be lost because another user is currently editing the content item.

In some embodiments, one or more of the services or storages/databases discussed above can be accessed using public or private application programming interfaces.

Certain software applications can access content storage 142 via an API on behalf of a user. For example, a software package such as an application running on client device 150, can programmatically make API calls directly to content management system 110 when a user provides authentication credentials, to read, write, create, delete, share, or otherwise manipulate content.

A user can view or manipulate content stored in a user account via a web interface generated and served by web interface service 124. For example, the user can navigate in a web browser to a web address provided by content management system 110. Changes or updates to content in the content storage 142 made through the web interface, such as uploading a new version of a content item, can be propagated back to other client devices associated with the user's account. For example, multiple client devices, each with their own client software, can be associated with a single account and content items in the account can be synchronized between each of the multiple client devices.

Client device 150 can connect to content management system 110 on behalf of a user. A user can directly interact with client device 150, for example when client device 150 is a desktop or laptop computer, phone, television, internet-of-things device, etc. Alternatively or additionally, client device 150 can act on behalf of the user without the user having physical access to client device 150, for example when client device 150 is a server.

Some features of client device 150 are enabled by an application installed on client device 150. In some embodiments, the application can include a content management system specific component. For example, the content management system specific component can be a stand-alone application 152, one or more application plug-ins, and/or a browser extension. However, the user can also interact with content management system 110 via a third-party application, such as a web browser, that resides on client device 150 and is configured to communicate with content management system 110. In various implementations, the client-side application 152 can present a user interface (UI) for a user to interact with content management system 110. For example, the user can interact with the content management system 110 via a file system explorer integrated with the file system or via a webpage displayed using a web browser application. Although some embodiments are discussed in relation to a web browser application, other types of server based applications configured to access content items stored on the content management system 110 may similarly be used.

In some embodiments, client application 152 can be configured to manage and synchronize content for more than one account of content management system 110. In such embodiments client application 152 can remain logged into multiple accounts and provide normal services for the multiple accounts. In some embodiments, each account can appear as folder in a file system, and all content items within that folder can be synchronized with content management system 110. In some embodiments, client application 152 can include a selector to choose one of the multiple accounts to be the primary account or default account.

While content management system 110 is presented with specific components, it should be understood by one skilled in the art, that the architectural configuration of system 100 is simply one possible configuration and that other configurations with more or fewer components are possible. Further, a service can have more or less functionality, even including functionality described as being with another service. Moreover, features described herein with respect to an embodiment can be combined with features described with respect to another embodiment.

While configuration 100 is presented with specific components, it should be understood by one skilled in the art, that the architectural configuration of system 100 is simply one possible configuration and that other configurations with more or fewer components are possible.

Figure 1B:
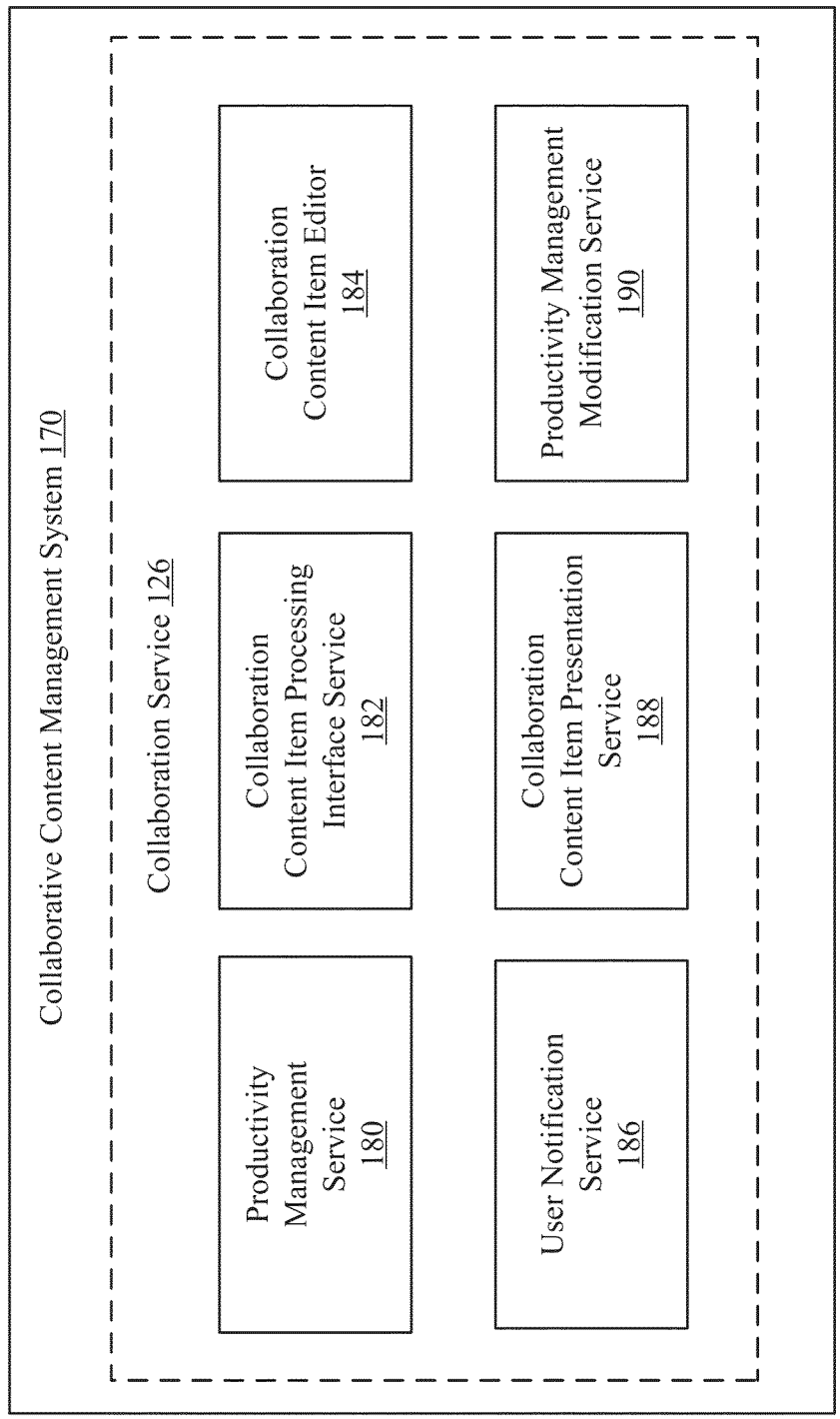
FIG. 1B shows an example collaboration content management system.

FIG. 1B shows an example collaboration content management system 170, according to some examples. Collaboration content management system 170 can include one or more servers and/or applications for hosting and running collaboration service 126. Collaboration content management system 170 can be part of content management system 110 or separate from content management system 110. For clarity and explanation purposes, collaboration content management system 170 will be described herein as part of content management system 110.

Collaboration service 126 can include one or more components and/or services. For example, collaboration service 126 may include productivity management service 180, collaboration content item processing interface service 182, collaboration content item editor 184, user notification service 186, collaboration content item presentation service 188, and productivity management modification service 190. Productivity management service 180, collaboration content item processing interface service 182, collaboration content item editor 184, user notification service 186, collaboration content item presentation service 188, and/or productivity management modification service 190 can include one or more services, components, devices, etc., such as physical servers, virtual machines, software containers, etc. Moreover, one or more of productivity management service 180, collaboration content item processing interface service 182, collaboration content item editor 184, user notification service 186, collaboration content item presentation service 188, and productivity management modification service 190 may be coupled to one another or to components not explicitly shown.

Productivity management service 180 may be configured to gather productivity data from content management system 110. In various embodiments, productivity management service 180 identifies an event and gathers information related to the event. For instance, productivity management service 180 may gather a specific calendar entry and/or a specific task from an online calendar. Productivity management service 180 may further gather information from the calendar entry or gather information related to the calendar entry such as time(s), date(s), relevant locations, title(s), agenda(s), summaries, description(s), and/or attendees related to the event. Productivity management service 180 may provide the productivity data to the other modules of collaboration service 126.

Collaboration content item processing interface service 182 may be configured to interface with collaboration service 126. In various embodiments, collaboration content item processing interface service 182 may provide collaboration content items to one or more modules of collaboration service 126, as described further herein.

Collaboration content item editor 184 may be configured to create and/or modify collaboration content items. A collaboration content item may be created in a variety of ways. In some embodiments, collaboration content item editor 184 enables creation of the collaboration content item into the content management system 106. Collaboration content item editor 184 may enable access to or be any collaboration content item editing application (e.g., Microsoft Word®. Google Does®, or the like) either in the cloud or executed locally. In one example, content management system 106 may provide to one of client devices 150 a user interface element (e.g., a box or a button) that allows creation of a new collaboration content item.

In some embodiments, collaboration content item editor 184 may create the collaboration content item in conjunction with the productivity management service 180. For example, collaboration content item editor 184 may provide a suggestion to a user to create or invoke a collaboration content item associated with an upcoming event. In various embodiments, collaboration service 126 may identify a user that is opening or otherwise using collaboration content item editor 184. Productivity management service 180 may identify an upcoming event for the user on the user's calendar. Subsequently, collaboration content item editor 184 may provide a suggestion to the user to create or invoke the collaboration content item associated with the upcoming event.

Although it is discussed that collaboration content item editor 184 may provide a suggestion to the user to create or invoke the collaboration content item associated with the upcoming event, it will be appreciated that the suggestion to create or invoke the collaboration content item may be made by any application. For example, a user may log into and/or otherwise access any application or suite of applications. Once the user is identified and an upcoming event is identified on the user's calendar, any application may provide the user with the suggestion to create or invoke the collaboration content item associated with the upcoming event. The suggestion may be provided to the user in any number of ways. In one example, an application suite management system (e.g., managing a variety of different applications) may provide the suggestion in a notification section of a window. In another example, a workspace may include the suggestion to the user in a section dedicated to notifications. In a further example, an email program may generate an email containing the suggestion to the user.

If the user requests creation or invocation of the collaboration content item in response to the suggestion, collaboration content item editor 184 may create or invoke the requested collaboration content item. If the application that provided the suggestion to the user is not a collaboration content item editor, then a collaboration content item editor may be executed and the requested collaboration content item created and/or invoked in response to the user's request.

In accordance with some embodiments, collaboration content item editor 184 may configure the productivity management service 180 to provide access to the collaboration content item (e.g., using a link, including the collaboration content item, or any other mechanism to enable access to the collaboration content item) in a meeting request, a task entry, or the like. In some embodiments, collaboration content item editor 184 may instruct productivity management service 180 to place an icon corresponding to a link to the collaboration content item in the calendar entry, meeting request, task entry, or the like. When a user has opened the link (e.g., by clicking the icon), the user may be directly guided to the collaboration content item from the meeting request, task entry, or the like. In one example, the link in the calendar entry may provide the user (e.g., using client device 150) access to a collaboration content item stored in content management system 106 (e.g., in storage accessible through the cloud) or in productivity management service 180.

Once the user requests to create or invoke the collaboration content item, collaboration content item editor 184 may create and/or invoke a collaboration content item. The collaboration content item may be subsequently edited, altered, viewed, changed, stored, and/or the like by an editing application (e.g., either stored locally on a client device or in the cloud). In various embodiments, one or more different client devices 150 may utilize different editing applications to make changes to the collaboration content item. Collaboration content item editor 184 and/or other editing applications may allow for the collaboration content item to be changed by multiple different users using different client devices 150 at the same time or substantially at the same time (e.g., in real time or substantially in real time).

It will be appreciated that users may be automatically guided to a collaboration content item related to a calendar entry, meeting request, a task entry, or the like without human intervention. In some embodiments, users may be guided to a collaboration content item related to a calendar entry, a meeting request, a task entry, or the like without having the users separately open collaboration content item editing applications. Such functionalities may prove particularly convenient for users seeking to take, review, or collaborate on notes associated with an event, as these users need not open applications other than productivity management applications.

Collaboration content item editor 184 may receive from users additional content for the collaboration content item. For example, collaboration content item editor 184 may be configured to receive from client devices 150 changes or edits to the collaboration content item. In various embodiments, the changes may include text, characters strings, or the like. The changes may also include annotations to the collaboration content item, comments to the collaboration content item, files to be attached to the collaboration content item, pictures to be attached to the collaboration content item, links to be attached to the collaboration content item, tasks related to the collaboration content item, or the like that can be incorporated into the collaboration content item. In various embodiments, edits to the collaboration content item are collaboration. For instance, collaboration content item editor 184 may obtain edits (e.g., text changes and/or additions of audio files, pictures, tables, or the like) from any number of client devices 150 at a given time (or in real time). Collaboration edits may be incorporated in a variety of formats, including formats that provide different text attributes such as colors, fonts, styles, or the like for different users.

In various embodiments, collaboration content item editor 184 (and or a security or permissions module associated with a server) may establish permissions and/or security for the collaboration content item. For example, collaboration content item editor 184 may enable event attendees to view and/or make edits to the collaboration content item while others may not have rights to view the collaboration content items and/or make changes. Permissions and/or security may be enforced in any number of ways. However, access to the collaboration content item may, in various embodiments, be provided to attendees of the event or a subset of attendees.

In some implementations, users can enter commands by providing pre-established primitives. A primitive can be a specified sequence of one or more characters that the content management system 106 recognizes as mapped to particular functionality. In some implementations, a primitive can be followed by one or more parameters specifying how the system should implement the corresponding functionality. Examples of primitives include a user identification primitive (e.g., "@" followed by a username parameter—referred to herein as a mention of a user), a task creation primitive (e.g., "[ ]" followed by a task title parameter), an emoji selector primitive (e.g., ":"), a content item selector and reference insertion primitive (e.g., "+" followed by at contentItem title parameter), a bullet list primitive (e.g., "*"), etc. Primitive parameters can define the corresponding functionality in various ways.

For example, the + primitive can operate by taking the content specified by a contentItemTitle parameter and attempting to match it to an existing content item. In some implementations, when such a match is found, the primitive, and any associated parameter, can be replaced in the collaboration content item with a reference to the content item, such as a URL. Such a reference, when activated, can load the referenced collaboration content item. In some implementations, a primitive can take another primitive as a parameter. For example, the content "[ ]@Jane" can be interpreted such that @Jane links to a user with the username "Jane," and this link is used by the primitive "[ ]" to creates a new task, where that task is assigned to the user Jane.

In various embodiments, collaborative content item editor 184 (and or a security or permissions module associated with a server) may establish permissions and/or security for the collaborative content item. For example, collaborative content item editor 184 may enable event attendees to view and/or make edits to the collaborative content item while others may not have rights to view the collaborative content items and/or make changes. Permissions and/or security may be enforced in any number of ways. However, access to the collaborative content item may, in various embodiments, be provided to attendees of the event or a subset of attendees.

In various embodiments, access to the collaboration content item is limited based on storage access rights. For example, a user with access rights to cloud storage may access, view, and/or make changes to the collaboration content item. In some embodiments, a user with access rights assigned by the content management system 106 may access, view, and/or make changes to the collaboration content item.

User notification service 186 may be configured to notify users of each of client devices 150 of information related to the state and/or contents of the collaboration content item. Notifications may be sent, for example as an email notification, a chat message notification, a notification in a display of the collaboration content item, or in relation to the collaboration content item through a file system or other organizational system. In various embodiments, user notification service 186 provides notifications about changes to client devices 150. For example, user notification service 186 may notify users whether a collaboration content item has been created for an event. As another example, user notification service 186 may notify specific users that they have been invited to attend an event.

Collaboration content item presentation service 188 may provide to client devices 150 selected collaboration content items. The collaboration content items may be displayed in client devices 150 through a native application, an Internet browsing window, or the like supported by client devices 150.

It will be appreciated that collaboration content item presentation service 188 may restrict writing permissions to the collaboration content items at any time. In an example, prior to occurrence of the event, collaboration content item presentation service 188 may restrict writing permissions to the collaboration content item (and turn the collaboration content item into a read-only collaboration content item) for all users except the creator or invoker of the collaboration content item. In some embodiments, the creator or invoker of the collaboration content item may select a subset of recipients to receive writing permissions.

Collaboration content item presentation service 188 may also support a collaboration content item viewing portal users can use to view existing collaboration content items. The collaboration content item viewing portal may order specific collaboration content items based on one or more ordering factors. "Ordering factors," as used herein, may include any factors used to order collaboration content items. Ordering factors can include factors used to order collaboration content items chronologically. More specifically, in some embodiments, the collaboration content item viewing portal orders collaboration content items according to the date(s) and/or times the collaboration content items were created. The collaboration content item viewing portal may also order collaboration content items according to the date(s) and/or time(s) the collaboration content items were edited. In various embodiments, the collaboration content item viewing portal orders collaboration content items according to the date(s) and/or time(s) of corresponding events to which the collaboration content items were related. Ordering factors can also include factors used to order collaboration content items according to the preferences of a specific user, such as whether the user has accepted events to which the collaboration content items were related.

In some embodiments, a collaboration content item viewing portal may be dedicated to a particular user who has received access to the collaboration content item because the particular user was related to an event. The user's collaboration content item viewing portal may provide access to any number of collaboration content items including the collaboration content item. The collaboration content items represented in the collaboration content item viewing portal may be ordered in any number of ways. For example, the collaboration content item viewing portal may order collaboration content items based on date and time of corresponding events.

The collaboration content item viewing portal may support search functions. For instance, the collaboration content item viewing portal may enable or allow searching for collaboration content items according to textual strings, titles, event attendees, and/or other attributes. The search functions may allow a specific user to search one or more collaboration content items for that user or for other users.

In some embodiments, productivity management modification service 190 may be configured to coordinate collaboration content items with calendar entries and to enable access to the collaboration content item through calendar entries.

Figure 2:
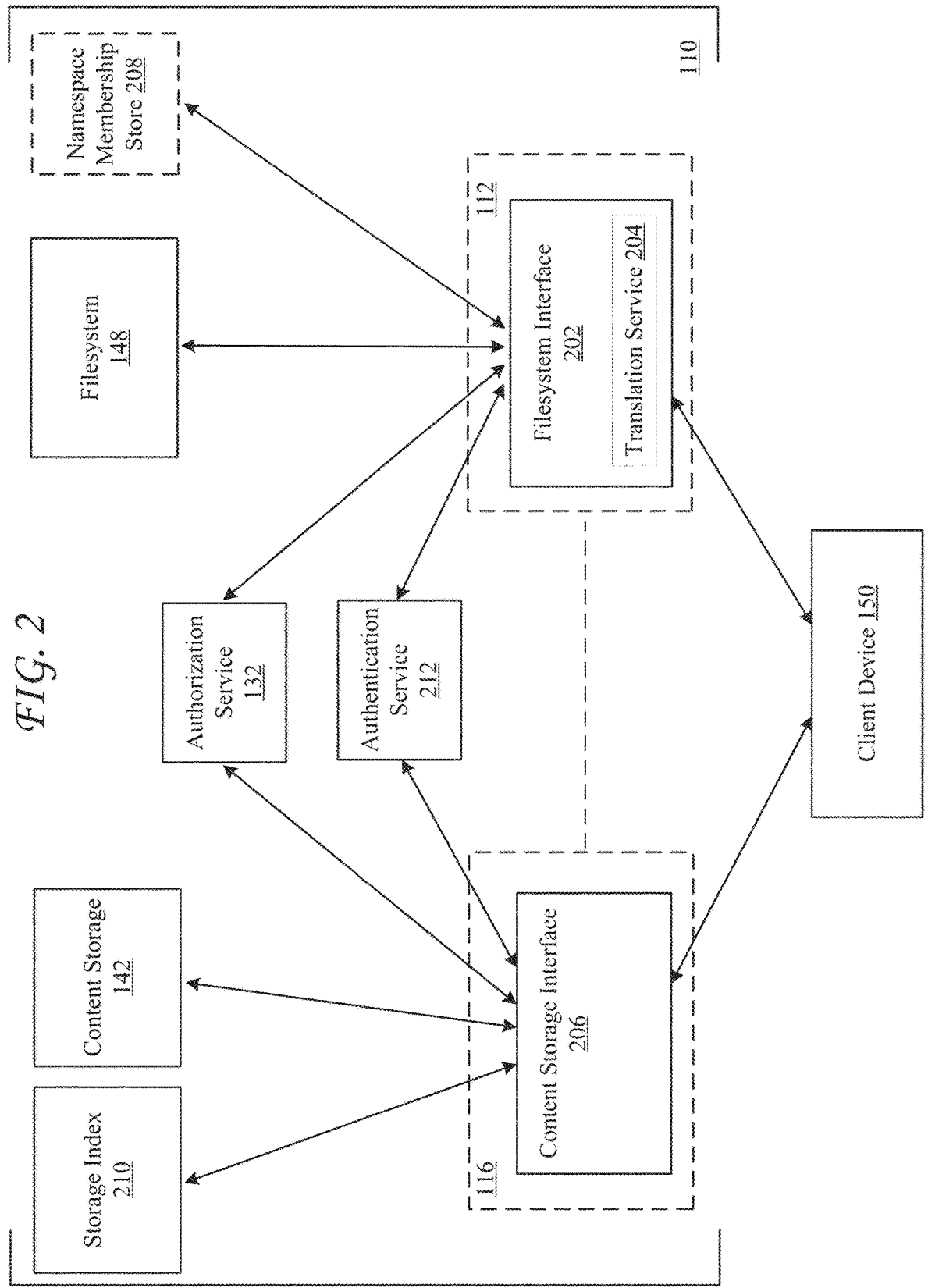
FIG. 2 shows a schematic diagram of an example architecture for synchronizing content between a content management system and client devices.

FIG. 2 shows a schematic diagram of example architecture for synchronizing content between content management system 110 and client device 150 in configuration 100. In this example, client device 150 interacts with content storage 142 and filesystem 148 respectively via content storage interface 206 and filesystem interface 202. Content storage interface 206 can be provided or managed by content storage service 116, and filesystem interface 202 can be provided or managed by server synchronization service 112. For example, content storage interface 206 can be a subcomponent or subservice of content storage service 116, and filesystem interface 202 can be a subcomponent or subservice of server synchronization service 112.

Content storage interface 206 can manage communications, such as content requests or interactions, between client device 150 and content storage 142. Content storage interface 206 can process requests from client device 150 to upload and download content to and from content storage 142. Content storage interface 206 can receive content requests (e.g., downloads, uploads, etc.) from client device 150, authenticate client device 150 via authentication service 212, communicate with authorization service 132 to determine if client device 150 (and/or the request from client device 150) is authorized to upload or download the content to or from content storage 142 (e.g., based on permissions in access control list 145), and interact with content storage 142 to download or upload the content associated with the content requests from client device 150. If the request from client device 150 is a request to download a content item, content storage interface 206 can retrieve the content item from content storage 142 and provide the content item to client device 150. If the request from client device 150 is a request to upload a content item, content storage interface 206 can obtain the content item from client device 150 and upload the content item to content storage 142 for storage.

When processing content requests from client device 150, content storage interface 206 can communicate with storage index 210 to check the availability and/or storage location of the requested content in content storage 142, and track content items in content storage 142. Storage index 210 can maintain an index of content items on content storage 142 which identifies the content items on content storage 142 and can also identify a respective location of the content items within content storage 142. Thus, storage index 210 can track content items on content storage 142 as well as storage locations of the content items. Storage index 210 can track entire content items, such as files, and/or portions of the content items, such as blocks or chunks. In some cases, content items can be split into blocks or chunks which can be stored at content storage 142 and tracked in storage index 210. For example, content storage 142 can store a content item as blocks or chunks of data which include respective data portions of the content item. Storage index 210 can track the blocks or chunks of the content item stored in content storage 142.

Filesystem interface 202 can manage communications, such as metadata requests and content synchronizations and operations, between client device 150 and filesystem 148. For example, filesystem interface 202 can translate, validate, authenticate, and/or process operations, configurations, and state information between client device 150 and filesystem 148. Filesystem interface 202 can verify permissions from an FSAuth token in a cursor or through authorization service 132 to authorize, or verify authorization of, requests sent by client device 150 to filesystem 148. When processing requests or operations from client device 150, filesystem interface 202 can access namespace membership store 208 to determine or verify namespace ownership information for any namespaces associated with the requests or operations from client device 150, and verify permissions of content associated with the requests or operations from client device 150.

Translation service 204 in filesystem interface 202 can perform linearization and translation operations for communications between client device 150 and filesystem 148. For example, translation service 204 can translate communications from client device 150 to a different format consistent with the structure and format of data in filesystem 148, and vice versa. To illustrate, in some cases, client device 150 can process content item information (e.g., state, changes, versions, etc.) at client device 150 as operations, while filesystem 148 can process the same information as content item revisions reflected by rows in a data structure such as a database table. To enable synchronization of content item information between client device 150 and filesystem 148, translation service 204 can translate operations from client device 150 into revisions suitable for filesystem 148, and can translate revisions reflected in rows of data on filesystem 148 to operations suitable for client device 150.

In some cases, content management system 110 (e.g., filesystem interface 202, authorization service 132, or content storage interface 206) can generate a token that verifies or indicates that client device 150 is authorized to access, update, download, or upload a requested content item. The token can include a device identifier associated with client device 150, an account identifier associated with a user account authenticated or authorized at client device 150, a session identifier associated with an authorized session at client device 150, a view context, an encryption key, access permissions to identified content item(s), etc. The token can be provided with or in a cryptographically signed data object called a cursor, which will be described in greater detail below. Content management system 110 (e.g., filesystem interface 202, authorization service 132, or content storage interface 206) can send the token(s) to client device 150, and client device 150 can provide the token to content management system 110 when requesting content item revisions and/or updates to filesystem 148 as further described below. Client device 150 can also provide the token to content storage interface 206 to validate any content requests (e.g., downloads, uploads, etc.). Content storage interface 206 can use the token to authorize queries to storage index 210 and upload or download content items to or from content storage 142.

For example, client device 150 can send to content storage interface 206 a request to upload a content item to content storage 142. The request can include the token and the content item to be uploaded. Content storage interface 206 can use the token to authorize a query to storage index 210 to check if the content item already exists on content storage 142, and/or authorize the upload of the content item to content storage 142. Client device 150 can provide the token to filesystem interface 202 to authorize a request to store metadata on filesystem 148 to track the upload and revision of the content item.

Figure 3:
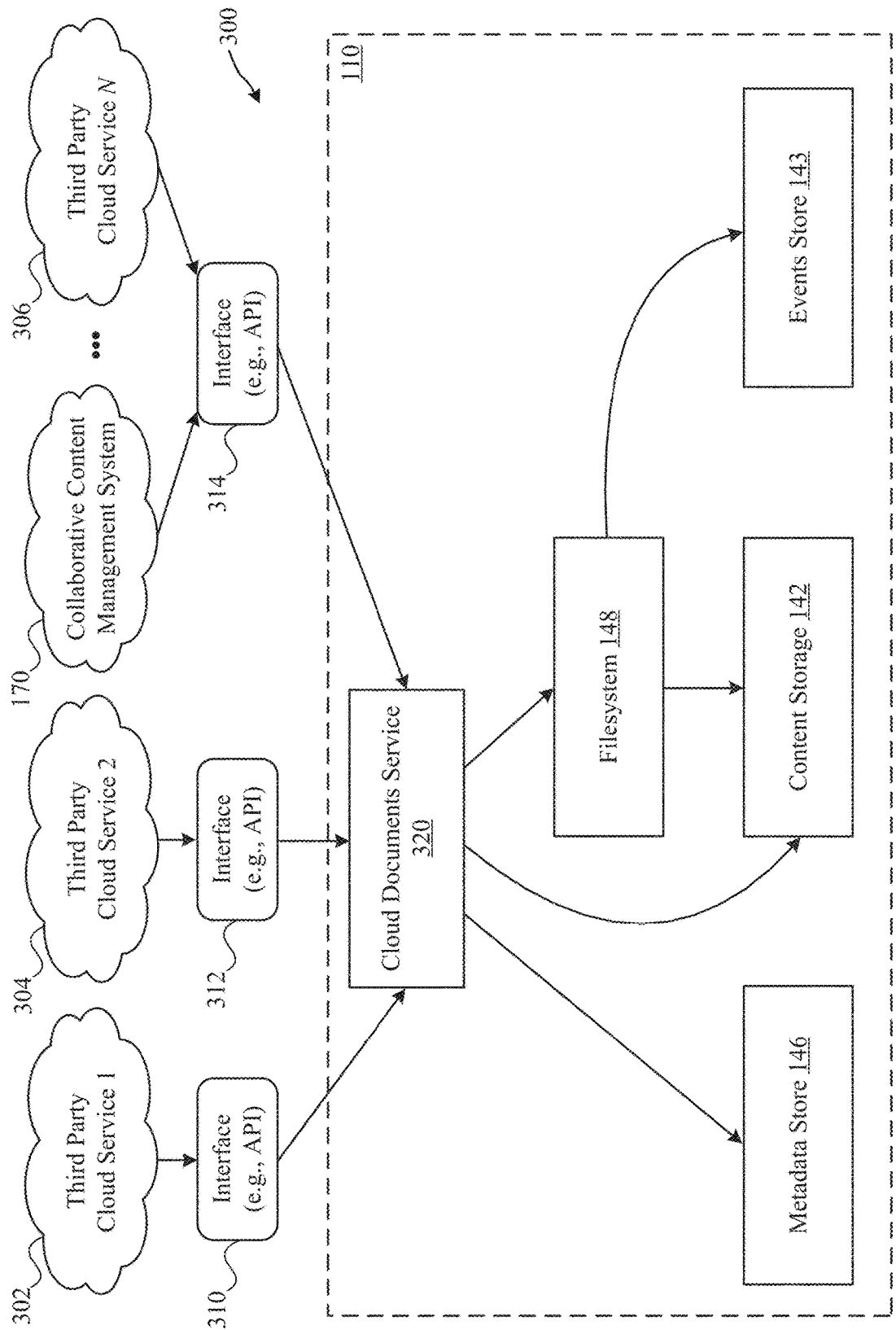
FIG. 3 shows an example architecture for integrating cloud-based documents and functionalities from different cloud services into a content management system.

FIG. 3 shows example architecture 300 for integrating cloud-based documents and functionalities from different cloud services into content management system 110. In this example, the different cloud services include third party cloud services 302, 304, 306 and collaborative content management system 170. Third party cloud services 302, 304, 306 and collaborative content management system 170 can store and manage various types of cloud-based documents, and can provide respective functionalities and features for the cloud-based documents, such as commenting, collaboration, sharing, editing, etc. The cloud-based documents can include documents or content items created, accessed, and/or manipulated via respective cloud-based applications or document editors.

Third party cloud services 302, 304, 306 and collaborative content management system 170 can host and/or provide one or more respective cloud-based applications or document editors for users to create, access, and/or interact with one or more respective types of cloud-based documents. In some cases, third party cloud services 302, 304, 306 and collaborative content management system 170 can provide one or more types of cloud-based applications or document editors respectively designed for one or more specific types of cloud-based documents. For example, a particular cloud-based application or document editor can be designed to handle a specific type of cloud-based document, including the creation, rendering, modification and other types of interactions with the cloud-based document, as well as other features or functionalities for the cloud-based document such as collaboration, commenting, sharing, publishing, etc.

In some cases, the cloud-based applications or document editors can allow users to create online or web-based documents, publish the online or web-based documents, share the online or web-based documents, collaborate with other users through the online or web-based documents, store the online or web-based documents on a cloud storage associated with one or more respective cloud services, and/or interact in other ways with the online or web-based documents and/or users having access to the online or web-based documents. Moreover, in some cases, the cloud-based applications or document editors can be web-based applications provided by the cloud services (302, 304, 306, 170) for creating and interacting with respective types of cloud-based documents.

The cloud-based applications or document editors can support various respective types of documents, files, content, content formats, content features, content functionalities, etc. In some cases, a particular type of cloud-based document and/or associated functionalities may only be supported (fully or partially) by a cloud-based application or document editor associated with that particular type of cloud-based document. In other cases, a particular type of cloud-based document and/or associated functionalities may be supported (fully or partially) by other software applications. For example, a particular type of cloud-based document may be partially or fully supported by one or more separate software applications or tools.

To illustrate, a cloud-based document may be partially supported by a software application or tool that is capable of rendering the cloud-based document without the use of a cloud-based application or document editor used to create and interact with that particular cloud-based document. In some cases, the software application or tool may support a limited set of features or functionalities for that cloud-based document, but the cloud-based application or document editor associated with that cloud-based document would be otherwise necessary to access that cloud-based document's full range of features or functionalities.

Third party cloud services 302, 304, 306 and collaborative content management system 170 can communicate with cloud documents service 320 via interfaces 310, 312, 314. Interfaces 310, 312, 314 can be, for example, application programming interfaces (APIs) for exchanging data between cloud documents service 320 and third party cloud services 302, 304, 306 and collaborative content management system 170. Cloud documents service 320 can be a service that implements the logic and/or functionalities for interacting with cloud-based documents from the cloud services (302, 304, 306, 170). For example, cloud documents service 320 can provide the functionality for communicating with the cloud services (302, 304, 306, 170) to retrieve and update metadata for respective cloud-based documents from the cloud services (302, 304, 306, 170), communicating with the cloud services (302, 304, 306, 170) to retrieve and update content of the respective cloud-based documents from the cloud services (302, 304, 306, 170), exchanging activity information associated with the respective cloud-based documents with the cloud services (302, 304, 306, 170), authenticating with the cloud services (302, 304, 306, 170), etc.

Cloud documents service 320 can support various operations for communicating with the cloud services (302, 304, 306, 170), accessing features and functionalities associated with cloud-based documents and/or content management system 110, interacting with cloud-based documents stored in content storage 142 and/or the cloud services (302, 304, 306, 170), etc. Non-limiting examples of operations supported by cloud documents service 320 include operations to create content (e.g., cloud-based documents and/or content associated with cloud-based documents), operations to authenticate with cloud services (302, 304, 306, 170), operations to receive or update metadata associated with cloud-based documents, operations to retrieve cloud-based documents and/or related data from content storage 142 and/or the cloud services (302, 304, 306, 170), operations to restore cloud-based documents (and/or associated data) or request restoration of cloud-based documents (and/or associated data) from the cloud services (302, 304, 306, 170), commenting operations, operations to generate and/or present previews of cloud-based documents, operations to share cloud-based documents (and/or associated data), operations to revert to previous versions of cloud-based documents, operations to modify cloud-based documents (e.g., rename, move, delete, edit, etc.), and so forth.

Cloud documents service 320 can communicate with filesystem 148 to store or access metadata associated with cloud-based documents from the cloud services (302, 304, 306, 170). Filesystem 148 can store and provide such metadata for use by cloud documents service 320 and any other service in content management system 110. The metadata can include, for example and without limitation, information regarding changes to the cloud-based documents, access information associated with the cloud-based documents, data logs associated with the cloud-based documents, unique identifiers (IDs) associated with the cloud-based documents, description information associated with the cloud-based documents, version numbers or information associated with the cloud-based documents, timestamps associated with filesystem entries corresponding to the cloud-based documents, change history information for the cloud-based documents, pointers to content associated with the cloud-based documents, folders, file paths, etc.

Cloud documents service 320 can also communicate with metadata store 146 to update or retrieve metadata and objects in metadata store 146. Metadata store 146 can store other metadata and objects such as entities or associations pertaining to user accounts, cloud-based documents, user groups, namespaces, memberships, etc. For example, metadata store 146 may store, without limitation, metadata describing content items (e.g., cloud-based documents), content item types, comments, indexing data, access permissions, user or group memberships, sharing information, etc. In some examples, metadata store 146 can also store information describing the relationship of content items (e.g., cloud-based documents) to one or more accounts, collections, groups, namespaces, folders, team entities, etc., in metadata store 146.

Cloud documents service 320 can communicate with content storage 142 to store and/or retrieve content from content storage 142. Cloud documents service 320 can store and retrieve content from the cloud-based documents and/or representations of cloud-based documents, such as canonical content items as further described below. For example, in some cases, content storage 142 may store the content of one or more cloud-based documents for access to the content directly from content storage 142. In this example, cloud documents service 320 may retrieve, store, or update such content in content storage 142.

In other examples, content storage 142 may only store representations of one or more cloud-based documents, such as canonical content items as further described below. In this example, the representations of cloud-based documents may be retrieved from content storage 142 and provided to client devices requesting access to the cloud-based documents, but some or all of the actual content in the cloud-based documents may not be included in the representations and instead obtained from respective cloud services (302, 304, 306, 170) as further described below.

Cloud documents service 320 can also communicate with events store 143 to store, retrieve, and/or update activity and event information associated with cloud-based documents. Cloud documents service 320 can monitor events or activity from events store 143, obtain status information associated with cloud-based documents from events store 143, process events and/or metrics based on information in events store 143, generate or provide notifications or alerts based on information in events store 143, etc.

Figure 4:
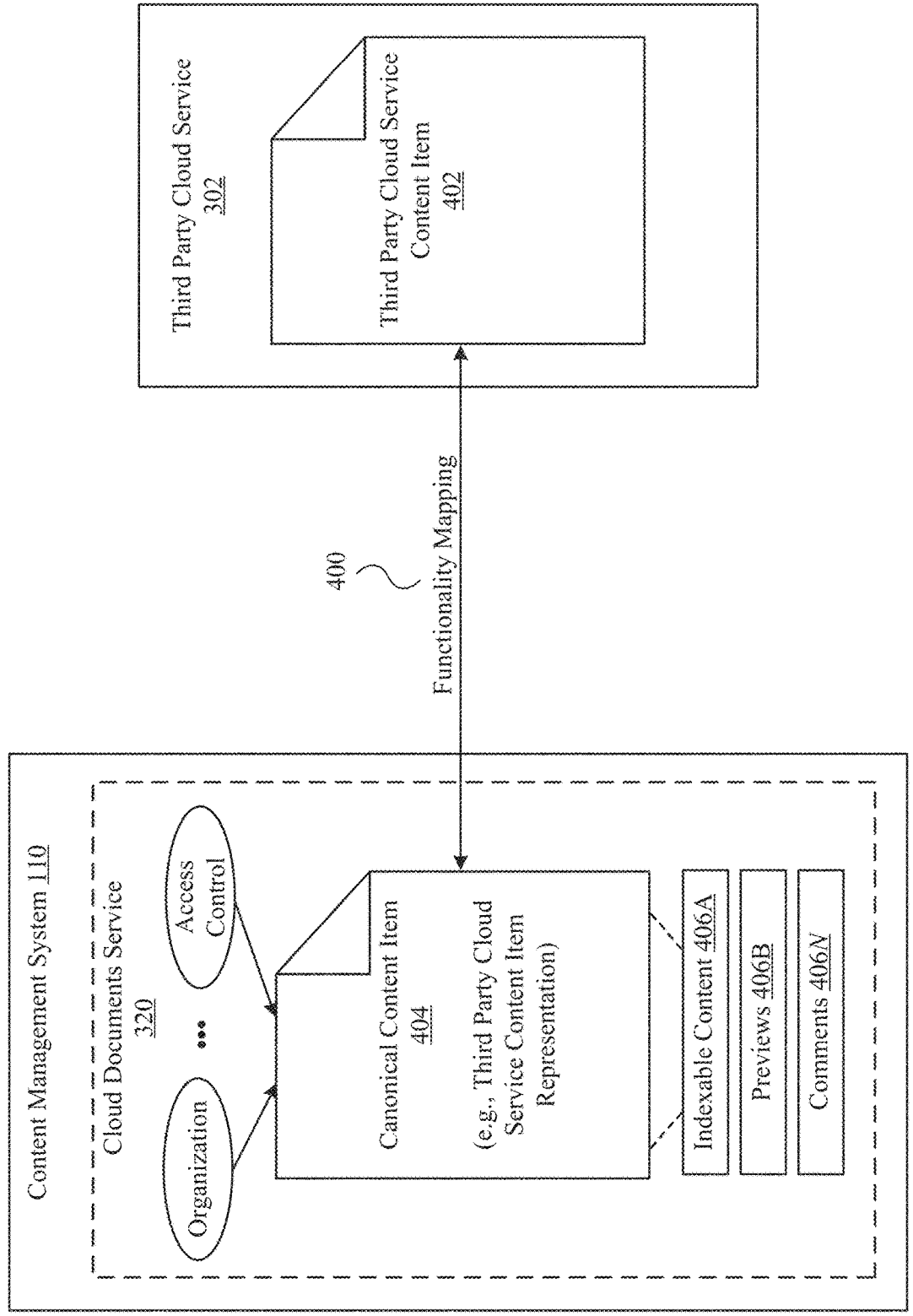
FIG. 4 shows example functionality mapping between a cloud service content item on a third party cloud service and a canonical content item in a content management system.

FIG. 4 shows example functionality mapping 400 between third party cloud service content item 402 on third party cloud service 302 and canonical content item 404 in content management system 110. Third party cloud service content item 402 can be a cloud-based content item hosted by third party cloud service 302 and created for (or using) a cloud-based application or document editor, such as a web-based application or document editor. Third party cloud service content item 402 can include specific formatting, content, features, and functionalities supported by third party cloud service 302 and the cloud-based application or document editor associated with third party cloud service content item 402. For example, third party cloud service content item 402 can include a specific type of data or content, specific sharing features, specific online collaboration features, specific web-publishing features, specific reviewing features, specific document or user behavior functionalities, etc.

In some cases, the content, features, and/or functionalities of third party cloud service content item 402 are only supported through third party cloud service 302 and a specific cloud-based application or document editor associated with third party cloud service content item 402. For example, the content, features, and/or functionalities of third party cloud service content item 402 may be specifically designed for, and supported by, third party cloud service 302 and an associated cloud-based application or document editor, and other applications, such as file-based local applications or content editors may not be able to access/render, edit, and/or interact with third party cloud service content item 402 or access the full range of features or functionalities available for third party cloud service content item 402 through third party cloud service 302 and an associated cloud-based application or document editor.

In other examples, the content, features, and/or functionalities of third party cloud service content item 402 may be partially or fully accessible and supported by other applications (e.g., applications other than a cloud-based application or document editor provided by third party cloud service 302 for third party cloud service content item 402), such as local and/or file-based applications or content editors. In such examples, users may access/render some or all of the content in third party cloud service content item 402, and may access some or all of the features or functionalities of third party cloud service content item 402 from the other applications that provide full or partial support for third party cloud service content item 402.

Canonical content item 404 can be a representation of third party cloud service content item 402 stored in content management system 110 for access by client devices having accounts on content management system 110. In some cases, canonical content item 404 may include some or all of the actual content of third party cloud service content item 402. In such cases, a user may access some or all of the actual content of third party cloud service content item 402 from canonical content item 404 in content management system 110.

In other cases, canonical content item 404 may not include the actual content (or all of the actual content) in third party cloud service content item 402. In such cases, canonical content item 404 may appear as a copy of third party cloud service content item 402 which can be used to access third party cloud service content item 402. Here, when canonical content item 404 is invoked by a client device, the client device can launch an instance of canonical content item 404 which obtains and presents the content of third party cloud service content item 402 from third party cloud service 302. The launched instance of canonical content item 404 may present or render the content of third party cloud service content item 402 and provide access to the features or functionalities of third party cloud service content item 402.

Thus, from the user's perspective, when canonical content item 404 is launched from the user's client device, the user experience in this example may be similar or identical to the experience when third party cloud service content item 402 is actually access from third party cloud service 302 through an associated cloud-based application or document editor. Therefore, while canonical content item 404 may not store the actual content from third party cloud service content item 402, the user experience when accessing canonical content item 404 may be indistinguishable (or almost indistinguishable) from the user experience when third party cloud service content item 402 is access directly from third party cloud service 302 and an associated cloud-based application or document editor.

Canonical content item 402 may include certain content and/or metadata associated with third party cloud service content item 402, such as indexable content 406A, previews 406B, comments 406N, etc. For example, content management system 110 may obtain (e.g., from third party cloud service 302 and/or via cloud documents service 320) content and/or metadata associated with third party cloud service content item 402, which content management system 110 can use to generate and/or store indexable content 406A, previews 406B, comments 406N, and/or any other relevant information.

Indexable content 406A can include one or more portions of content or metadata associated with third party cloud service content item 402, which can be used for indexing and searching of data associated with third party cloud service content item 402. Previews 406B can be used to generate a rendered preview of third party cloud service content item 402 without launching an entire instance of third party cloud service content item 402. Comments 406N can be used to associate third party cloud service content item 402 and/or content in third party cloud service content item 402 with specific comments provided by one or more users with access to third party cloud service content item 402. Comments 406N can allow various user comments created through third party cloud service 302 and/or content management system 110 to be presented and/or identified when a user accesses canonical content item 404.

Content management system 110 may manage or control various features or functionalities on content management system 110 for canonical content item 404, such as the storage and organization of canonical content item 404 within a user's account and/or client device, access control permissions (e.g., read permissions, edit permissions, sharing permissions, etc.) for canonical content item 404, etc. In some cases, content management system 110 may extend the features and/or functionalities provided by third party cloud service 302 for third party cloud service content item 402 and thus associated with canonical content item 404 to include one or more features or functionalities supported by content management system 110, such as sharing functionalities, synchronization functionalities, local storage functionalities, events or notification functionalities, commenting functionalities, rating functionalities, collaboration functionalities, etc.

Moreover, content management system 110 may control or manage where and how canonical content item 404 is depicted within a user's account or content organizational structure (e.g., hierarchical organization, folder or filesystem based organization, etc.). For example, content management system 110 can depict canonical content item 402 within a particular folder, collection, or location on the user's account and/or client device as in a way that appears as if third party cloud service content item 402 and its associated content is being stored through content management system 110 according to a specific organization or storage scheme associated with a user's content in content management system 110.

Figure 5A:
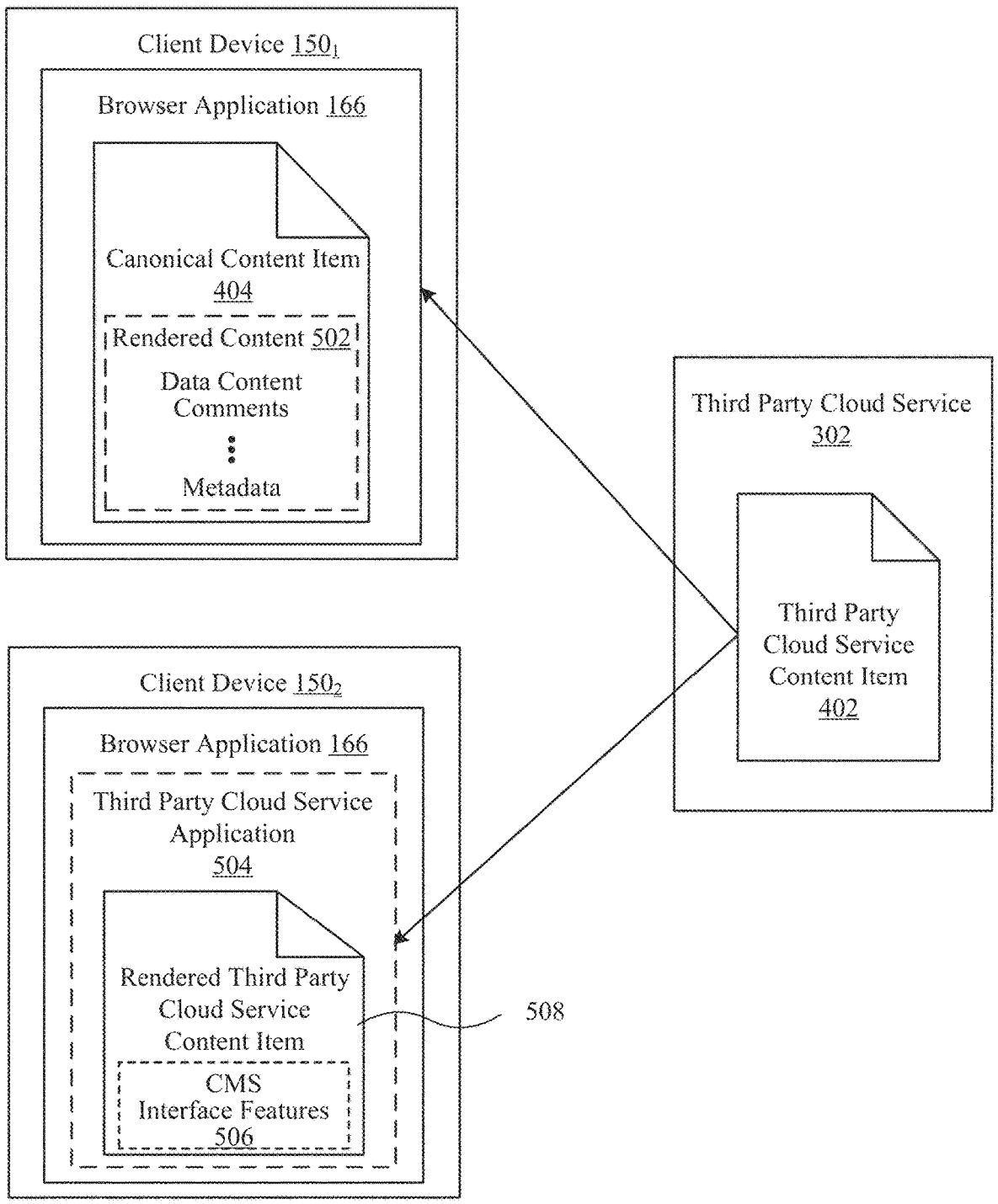
FIG. 5A shows an example user experience and use case of a canonical content item being accessed through a browser application on a client device and a cloud service content item being accessed through a browser application on another client device.

FIG. 5A shows an example user experience and use case of canonical content item 404 being accessed through browser application 166 on client device 150₁ and third party cloud service content item 402 being accessed through browser application 166 on client device 150₂. In this example, a user on client device 150₁ can access the content of third party cloud service content item 402 through canonical content item 404 and a user on client device 150₂ can access the content of third party cloud service content item 402 directly from third party cloud service 302.

Canonical content item 404 can be accessed from client device 150₁ through browser application 166. Prior to being launched or invoked, canonical content item 404 can appear to the user as a copy of third party cloud service content item 402. When client device 150₁ invokes or launches canonical content item 404 through browser application 166, browser application 166 can receive the content of third party cloud service content item 402 from third party cloud service 302 and present the content as rendered content 502. Rendered content 502 can display the content of third party cloud service content item 402, enable access to features and functionalities of third party cloud service content item 402, and provide a user experience that is similar or identical to the user experience when third party cloud service content item 402 is accessed directly from third party cloud service 302 through a corresponding cloud-based application or document editor. Rendered content 502 may resemble or mirror the layout of third party cloud service content item 402, the formatting of third party cloud service content item 402, the features of third party cloud service content item 402, etc., and may depict the content of third party cloud service content item 402 as configured in third party cloud service content item 402.

On the other hand, client device 150₂ is depicted accessing third party cloud service content item 402 directly from third party cloud service 302 through browser application 166. In this example, to access third party cloud service content item 402 from client device 150₂, browser application 166 implements third party cloud service application 504, which can be, for example, a web or cloud-based application or document editor provided by third party cloud service 302 for third party cloud service content item 402 and other cloud-based documents that are the same or similar type as third party cloud service content item 402.

Third party cloud service application 504 can communicate with third party cloud service 302 to retrieve the content and features of third party cloud service content item 402 and provide an online rendering of third party cloud service content item 402. Thus, through third party cloud service application 504, browser application 166 on client device 150₂ can present rendered third party cloud service content item 508 depicting third party cloud service content item 402, including its content and features. The user experience in this example is similar or identical to the user experience associated with canonical content item 404 at client device 150₁, but the access and process is different, with client device 150₂ implementing third party cloud service application 504 to access the content and features of third party cloud service content item 402 from third party cloud service 302.

In some cases, rendered content 502 on client device 150₁ and/or rendered third party cloud service content item 508 on client device 150₂ can include CMS interface features 506, which are features or functionalities provided through content management system 110 on top of those features or functionalities provided by third party cloud service 302 for third party cloud service content item 402. For example, rendered content 502 and/or rendered third party cloud service content item 508 can be extended to include one or more features supported or provided by content management system 110, such as a feature for ranking or rating the rendered document (e.g., 502, 508) or portions of the rendered content (502, 508), a notifications feed for accessing activity notifications and/or alerts associated with the rendered content (502, 508) and/or third party cloud service content item 402, collaboration features such as co-authoring and chatting, commenting features, sharing features, etc.

Figure 5B:
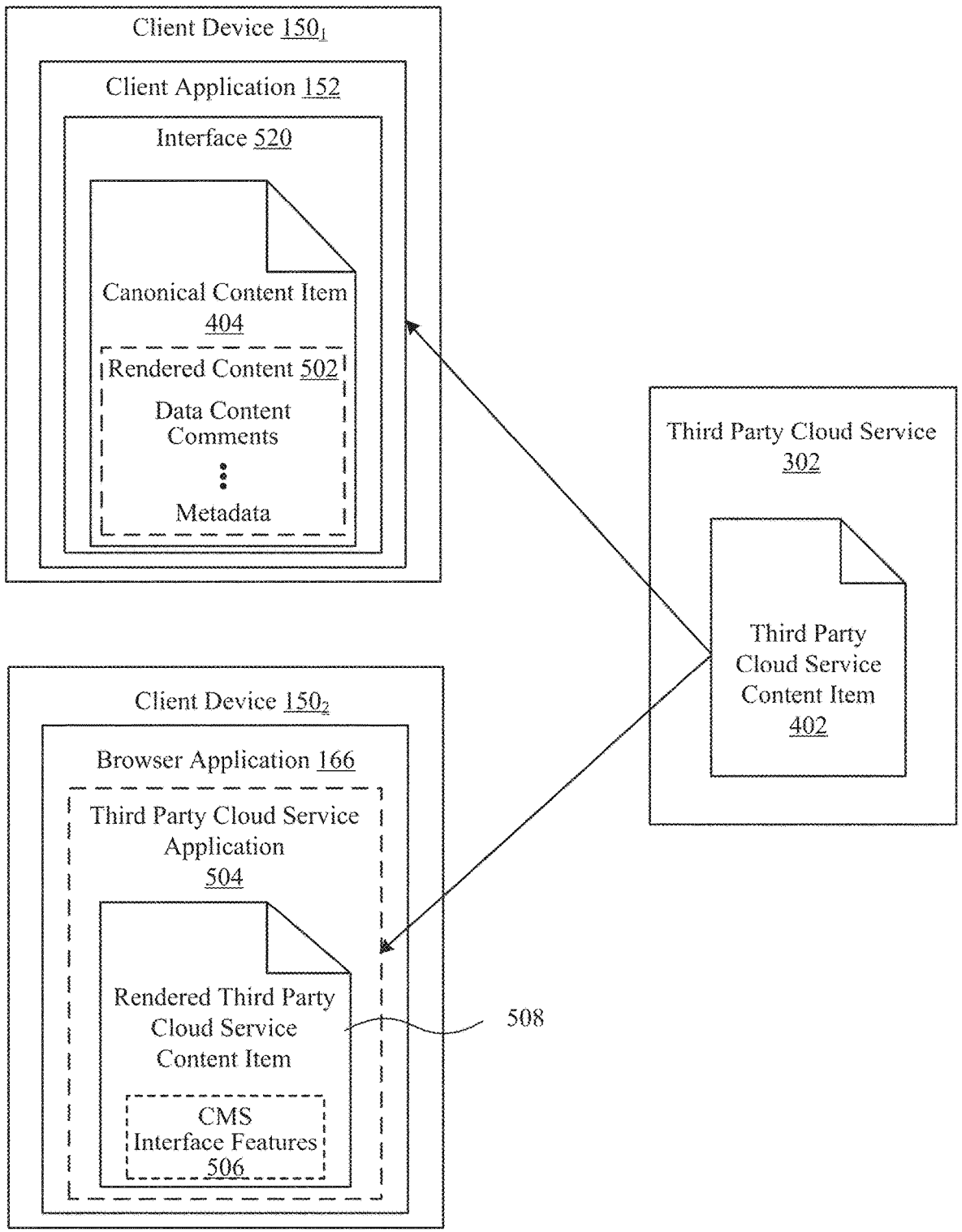
FIG. 5B shows another example user experience and use case of a canonical content item being accessed through a client application on a client device and a cloud service content item being accessed through a browser application on another client device.

FIG. 5B shows another example user experience and use case of canonical content item 404 being accessed through client application 152 on client device 150₁ and third party cloud service content item 402 being accessed through browser application 166 on client device 150₂. The user experience and use case of third party cloud service content item 402 being accessed through browser application 166 and third party cloud service application 504 on client device 150₂ is the same as shown in FIG. 5A, but is provided in this example to depict the differences and similarities in the process and user experience in this use case relative to the example use case when canonical content item 404 is accessed through client application 152 on client device 150₁, as shown in FIG. 5B.

As shown in FIG. 5B, a user on client device 150₁ can access the content of third party cloud service content item 402 through canonical content item 404 and client application 152, as opposed to accessing the content of third party cloud service content item 402 directly from third party cloud service 302 using browser application 166 and third party cloud service application 504 as depicted with respect to client device 150₂. Prior to being launched or invoked, canonical content item 404 can appear to the user as a copy of third party cloud service content item 402 available through client application 152. When client device 150₁ invokes or launches canonical content item 404 through client application 152, client application 152 can receive the content of third party cloud service content item 402 from third party cloud service 302 and present the content on interface 520 as rendered content 502.

Interface 520 can be an interface provided by client application 152, the operating system or windowing system at client device 150₁, and/or any other tool or software at client device 150₁. Rendered content 502 can display the content of third party cloud service content item 402, enable access to features and functionalities of third party cloud service content item 402, and provide a user experience that is similar or identical to the user experience when third party cloud service content item 402 is accessed directly from third party cloud service 302 through a corresponding cloud-based application or document editor. Rendered content 502 may resemble or mirror the layout of third party cloud service content item 402, the formatting of third party cloud service content item 402, the features of third party cloud service content item 402, etc., and may depict the content of third party cloud service content item 402 as configured in third party cloud service content item 402.

Moreover, client application 152 may depict canonical content item 402 as a file or content item locally stored in the filesystem of client device 150₁. In some cases, canonical content item 402 may not include all of the actual content of third party cloud service content item 402, as previously explained. However, client application 152 may depict canonical content item 402 on client device 150₁ as if all the actual content of third party cloud service content item 402 is also stored as part of canonical content item 402. Thus, the user at client device 150₁ may be unaware that canonical content item 402 does not actually store all the content of third party cloud service content item 402.

As shown in FIGS. 5A and 5B, browser application 166 and client application 152 can present third party cloud service content item 402 (e.g., rendered content 502) on client device 150₁ without the use or need of third party cloud service application 504. Thus, the techniques herein allow content management system 110 to provide client device 150₁ access to the content and features of third party cloud service content item 402 without implementing or using an application that natively supports third party cloud service content item 402, such as third party cloud service application 504.

Figure 6A:
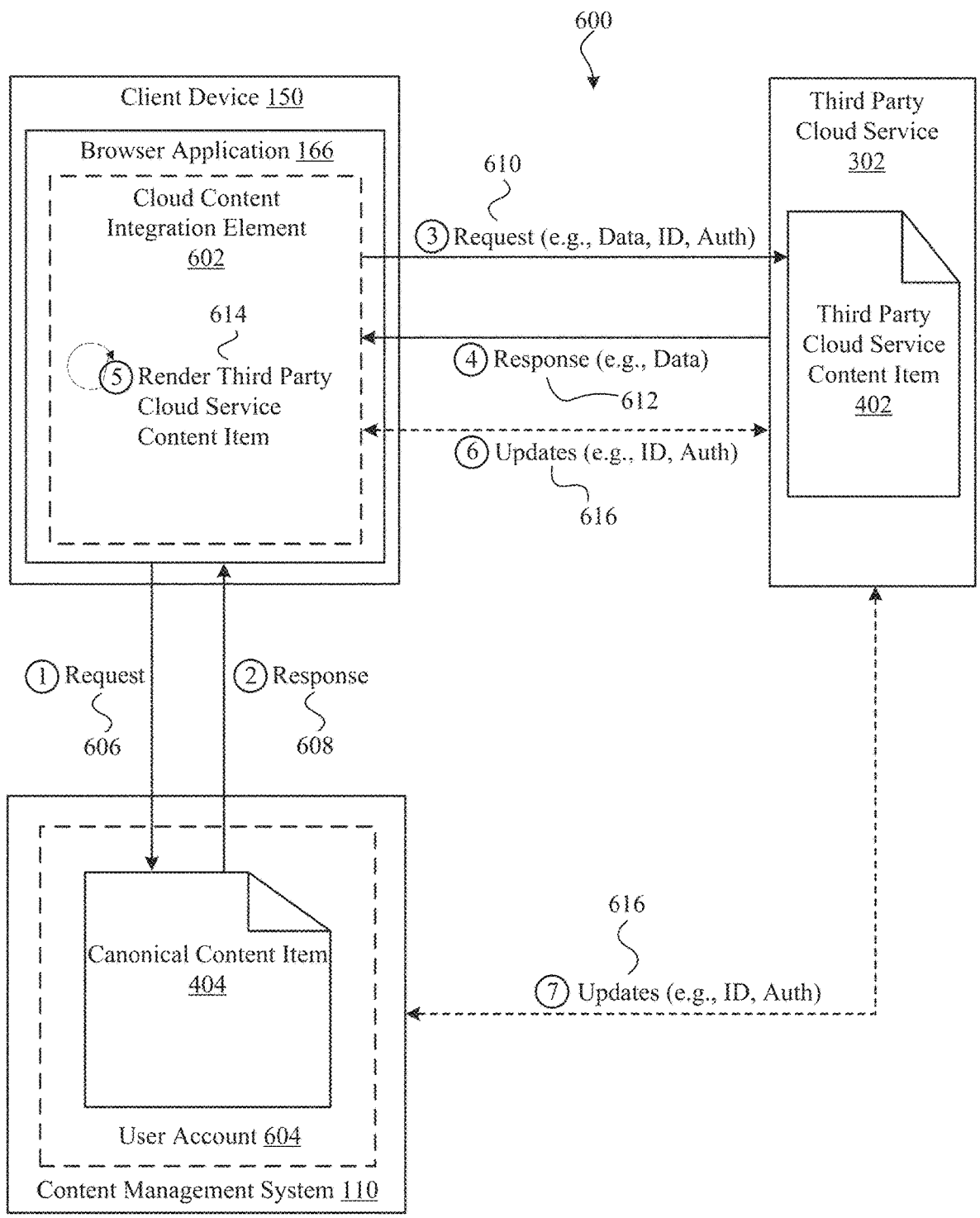
FIG. 6A shows an example process for providing a representation of a cloud service content item, and providing a client device access to the content and functionalities of the cloud service content item through the representation of the cloud service content item.

FIG. 6A shows an example process (600) for providing a representation (e.g., canonical content item 404) of third party cloud service content item 402 in content management system 110, and providing client device 150 access to the content and functionalities of third party cloud service content item 402 through canonical content item 404 on content management system 110.

Figure 6B:
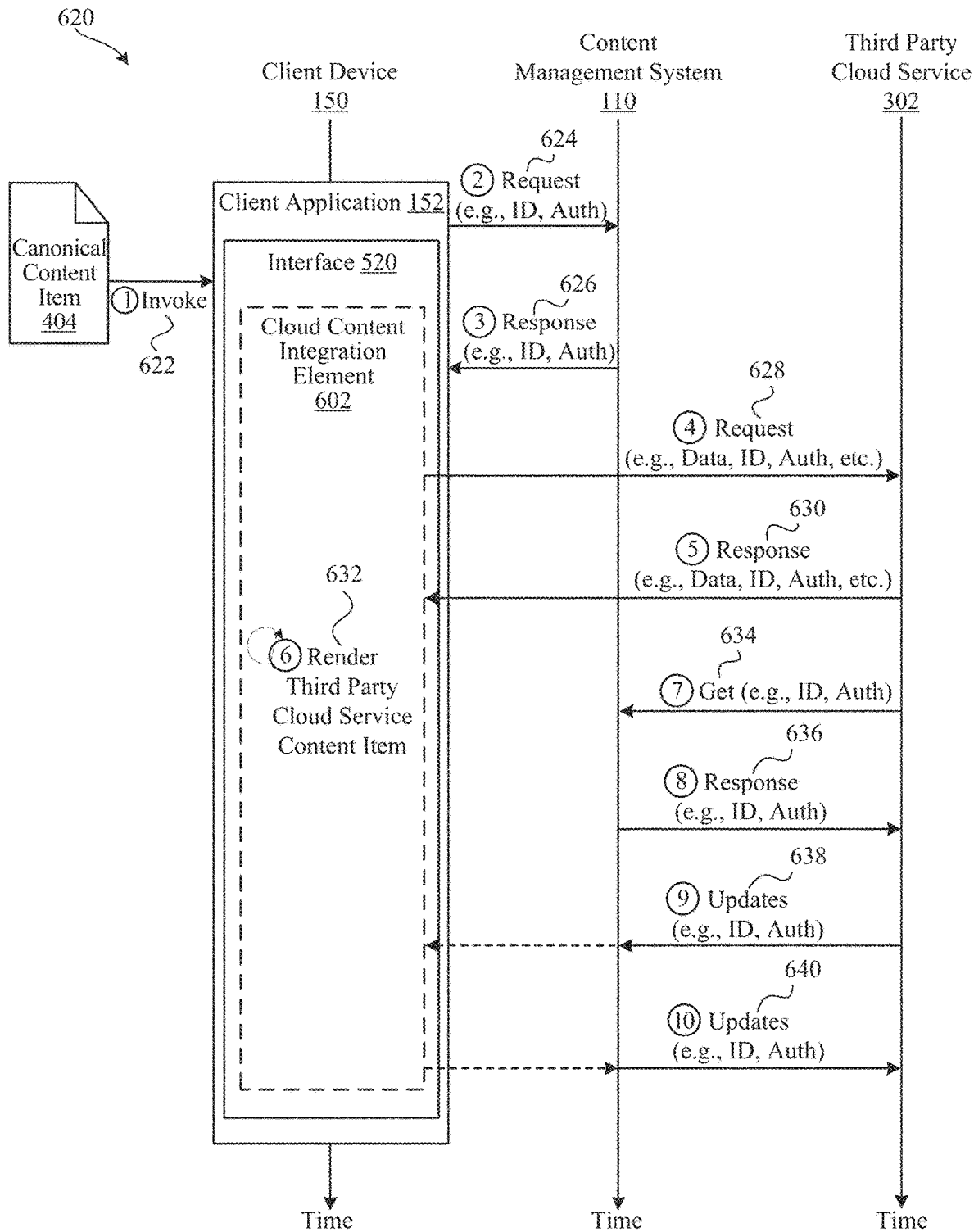
FIG. 6B shows an example process for providing a client device access to the content and functionalities of a cloud service content item through a canonical content item and client application on a client device.

In this example, canonical content item 404 is stored in user account 604 on content management system 110. User account 604 can be a user's account registered on content management system 110, which contains content items stored and maintained by the user on content management system 110. In some cases, the content items, including canonical content item 404, in user account 604 can also be stored and synchronized locally on client device 150 as previously explained. Thus, while canonical content item 404 is depicted in FIG. 6A as being stored in content management system 110, in other examples canonical content item 404 may also be stored and accessed locally on client device 150, as shown in FIG. 6B and further described below.

In process 600, browser application 166 on client device 150 first sends request 606 to content management system 110 for canonical content item 404. Content management system 110 can receive request 606 and send response 608 to browser application 166, which browser application 166 can use to continue with process 600 to render/present a representation of third party cloud service content item 402 on client device 150. Response 608 can include, for example, metadata associated with third party cloud service content item 402, which browser application 166 can use to present or render a representation of third party cloud service content item 402.

For example, response 608 can include an identifier (ID) that can be used to request the content of third party cloud service content item 402 from third party cloud service 302, authentication information (e.g., an authentication token) that can be used to authenticate third party cloud service 302 with content management system 110 to allow the flow of data (e.g., third party cloud service content item 402, associated metadata, associated content, etc.) and/or communications between content management system 110 and third party cloud service 302, a title identifying third party cloud service content item 402, access control permissions configured for user account 604 that define the level of access to the content of third party cloud service content item 402 configured for user account 604, an address or resource identifier for requesting or obtaining the content of third party cloud service content item 402 from third party cloud service 302, and/or any other information or metadata associated with canonical content item 404.

Browser application 166 can receive response 608 from content management system 110 and send, via cloud content integration element 602, request 610 to third party cloud service 302 for content and/or data associated with third party cloud service content item 402. Cloud content integration element 602 can be an interface and/or communication element within browser application 166 configured to communicate with third party cloud service 302 to receive content and data associated with third party cloud service content item 402 and exchange with third party cloud service 302 updates, metadata, and/or any other information associated with third party cloud service content item 402. In some cases, cloud content integration element 602 can be a page, an IFrame (inline frame), an interface or web page element, a plugin, a browser tool or element, or software code that is implemented or executed by browser application 166 to communicate with third party cloud service 302 and provide access to content and functionalities of third party cloud service content item 402 through browser application 166 on client device 150. Cloud content integration element 602 can be configured to send and/or receive calls or requests for content and information associated with third party cloud service content item 402 to and/or from third party cloud service 302.

As previously noted, cloud content integration element 602 can send request 610 to third party cloud service 302 for content and information associated with third party cloud service content item 402. Request 610 can include, for example, an ID uniquely identifying third party cloud service content item 402 at third party cloud service 302, authentication information (e.g., a token for third party cloud service 302 to use to authenticate with content management system 110), a title identifying third party cloud service content item 402, access control information indicating a level of access to content associated with third party cloud service content item 402 defined for user account 604 and/or client device 150, metadata associated with third party cloud service content item 402 and/or user account 604, and/or any other information associated with third party cloud service content item 402 and/or user account 604.

Cloud content integration element 602 can receive response 612 from third party cloud service 302. Response 612 can include data associated with third party cloud service content item 402, such as the content in third party cloud service content item 402, metadata (e.g., comments, preview(s), indexable content, state information, description information, access information, status or activity information, user information, etc.) associated with third party cloud service content item 402, etc.

Cloud content integration element 602 and browser application 166 can use the data in response 612 to render 614 third party cloud service content item 402 or a representation of third party cloud service content item 402 in browser application 166. At this point, a user at client device 150 can view, access and interact with the content and features of third party cloud service content item 402 from browser application 166. The user can read the content of third party cloud service content item 402, modify the content, add content, add or modify metadata (e.g., comments, etc.), and otherwise interact with the content and rendered representation of third party cloud service content item 402 from browser application 166 in a similar fashion as when the user access third party cloud service content item 402 directly from third party cloud service 302 through a cloud-based application or document editor (e.g., 504) provided for third party cloud service content item 402.

In some cases, cloud content integration element 602 can also send or receive updates 616 to or from third party cloud service 302 associated with third party cloud service content item 402. Updates 616 can include changes and/or information associated with third party cloud service content item 402, such as content or content changes (e.g., rename operations, edit or write operations, delete operations, purge operations, move operations, restore operations, revert operations, add or create operations, etc.), metadata or events (e.g., comments, title information or changes, IDs or ID changes, access information or permissions, organization or storing information, membership information, sharing information, user information, user activity information, tasks, timestamps, completed tasks or items, etc.), a token to authenticate third party cloud service 302 with content management system 110, and so forth. In some examples, cloud content integration element 602 can receive updates 616 from third party cloud service 302 and implement such updates in the rendered third party cloud service content item on browser application 166, canonical content item 404, and/or user account 604.

In some cases, content management system 110 can similarly send or receive updates 616 to or from third party cloud service 302. Content management system 110 can, for example, send updates 616 when it detects changes to content or metadata associated with third party cloud service content item 402 and can receive updates 616 when content or metadata associated with third party cloud service content item 402 are modified at third party cloud service 302. Content management system 110 can implement any changes to content or metadata received in updates 616 from third party cloud service 302. For example, content management system 110 can update metadata associated with canonical content item 404, such as comments, state, access information, storage information, or other information, based on updates 616 received from third party cloud service 302. Updates 616 can thus synchronize or harmonize information associated with third party cloud service content item 402 on third party cloud service 302 and canonical content item 404 on content management system 110.

FIG. 6B shows an example process (620) for providing client device 150 access to the content and functionalities of third party cloud service content item 402 through canonical content item 404 and client application 152 on client device 150. In this example, canonical content item 404 is stored on client device 150 along with other content items in user account 604 registered on content management system 110. Process 620 allows a user to store and access the content and features of third party cloud service content item 402 from client application 152 without use of an application, such as a cloud-based application or content editor, designed to natively support third party cloud service content item 402.

In this example, client application 152 invokes 622 canonical content item 404 on client device 150, and sends request 624 to content management system 110 for authentication information associated with third party cloud service content item 402. Request 624 can include a unique identifier associated with canonical content item 404 and third party cloud service content item 402, as well as other information such as a title, user account information, login information, metadata, etc. Content management system 110 can receive request 624, verify permissions and/or authentication, and send response 626 to client application 152. Response 626 can include authentication information, such as an authentication token which third party cloud service 302 can obtain and use to authenticate with content management system 110 to send, receive, and/or request content and metadata associated with third party cloud service content item 402.

It should be noted that in some examples, client application 152 may skip the process of sending request 624 to content management system 110 and receiving response 626, and instead perform the remaining steps in process 620 without first sending request 624 and receiving response 626. For example, client application 152 may already have an authentication token or cached authentication information available and thus may not have to send request 624 to content management system 110. In some cases, client application 152 may send request 624 to content management system 110 if it determines it does not already have an authentication token or other authentication information, or if an existing authentication token or authentication information has expired, is invalid, or otherwise should be refreshed, updated, or replaced.

Client application 152 can implement or execute cloud content integration element 602 to communicate with third party cloud service 302 as previously described. Here, cloud content integration element 602 can use the information in response 626, such as an authentication token, a unique identifier, access control information, a title, etc., to send request 628 to third party cloud service 302 for third party cloud service content item 402. Request 628 can include, for example, authentication information and an ID that third party cloud service 302 can use to authenticate, identify and retrieve content and/or metadata associated with third party cloud service content item 402, and send the content and/or metadata to cloud content integration element 602.

Cloud content integration element 602 can receive response 630 sent by third party cloud service 302. Response 630 can include the content in third party cloud service content item 402, metadata associated with third party cloud service content item 402, a token or authentication information to authenticate with content management system 110, etc. Client application 152 and/or cloud content integration element 602 can use the content and any metadata in response 630 to render 632 a copy or representation of third party cloud service content item 402 (e.g., present the content of third party cloud service content item 402 and any associated features or functionalities) on interface 520 at client device 150, and provide support for any features or functionalities associated with third party cloud service content item 402. Interface 520 can be any graphical user interface. For example, interface 520 can be a user interface or a portion/section of a user interface provided by client application 152, a user interface or window provided by an application on client device 150, a user interface or window provided by an operating system or windowing system on client device 150, a page such as an HTML or other web page, etc.

At this point, the user at client device 150 can access and interact with the content and features of third party cloud service content item 402 from interface 520 on client device 150. In some cases, process 620 can include steps for exchanging updates and other information between cloud content integration element 602, content management system 110, and/or third party cloud service 302.

For example, if third party cloud service 302 has updates associated with third party cloud service content item 402, such as comments, content changes, metadata changes, etc., third party cloud service 302 can send message 634 including or requesting authentication information for authenticating with content management system 110 to provide such updates from third party cloud service 302. In some cases, message 634 can include authentication information (e.g., a token), identification information (e.g., a unique ID), and/or metadata associated with third party cloud service content item 402. Moreover, in some cases, message 634 can include an ID associated with third party cloud service content item 402 that content management system 110 can use to identify third party cloud service content item 402 and associate message 634 with third party cloud service content item 402.

Content management system 110 can send response 636, which can include, for example, authentication information, such as an authentication token, that third party cloud service 302 can use to authenticate with content management system 110 to provide data or updates associated with third party cloud service content item 402. In some cases, response 636 can include other information, such as a unique ID, a title of third party cloud service content item 402, access permissions associated with third party cloud service content item 402, metadata associated with third party cloud service content item 402, updates available at content management system 110, and so forth.

Third party cloud service 302 can receive response 636, verify permissions associated with third party cloud service content item 402 and/or associated data, and send updates 638 to content management system 110 and/or cloud content integration element 602. In some examples, updates 638 can include authentication information (e.g., an authentication token) for authenticating with content management system 110, updated content associated with third party cloud service content item 402, and/or metadata associated with third party cloud service content item 402. Content management system 110 can use the information in updates 638 to modify or update information associated with third party cloud service content item 402 and/or canonical content item 404. For example, content management system 110 can use the information in updates 638 to store, modify, present, and/or update metadata or events (e.g., comments, document information, access information or permissions, content descriptions, user activity, tasks, messages, timestamps, notifications, modifications, etc.) and/or content stored at content management system 110 and/or client device 150 for third party cloud service content item 402 and/or canonical content item 404.

Similarly, cloud content integration element 602 can use the information in updates 638 to update the content and/or metadata associated with the copy or representation of third party cloud service content item 402 rendered or presented on client device 150. For example, cloud content integration element 602 can use the information in updates 638 to update the content presented by interface 520 and/or the features or functionalities provided at interface 520 for third party cloud service content item 402.

If any changes are made at client device 150 to content or metadata associated with third party cloud service content item 402, cloud content integration element 602 can send updates 640 to content management system 110 and/or third party cloud service 302 to propagate or implement such changes on the content management system 110 and/or third party cloud service 302. For example, if the user at client device 150 adds a comment to the content rendered by interface 520 or executes a content operation such as a rename or edit associated with third party cloud service content item 402, cloud content integration element 602 can provide the added comment or content operation (and/or associated changes) to content management system 110 and/or third party cloud service 302 for storage and updating of such information pertaining to third party cloud service content item 402. To illustrate, cloud content integration element 602 can send third party cloud service 302 updates 640 including changes to content in third party cloud service content item 402 made by a user via interface 520 during a presentation of third party cloud service content item 402 at client device 150.

Third party cloud service 302 can receive updates 640 from cloud content integration element 602 and implement such changes on third party cloud service content item 402 at third party cloud service 302. This allows the user to interact with a rendered version of third party cloud service content item 402 on client device 150, make changes to the content, and utilize the various features or functionalities of third party cloud service content item 402, without creating conflicting versions of third party cloud service content item 402 or otherwise ensuring that any changes implemented on client device 150 are reconciled with a current copy or version of third party cloud service content item 402 on third party cloud service 302 and/or any copies or versions of third party cloud service content item 402 on any other devices or locations.

Figure 7:
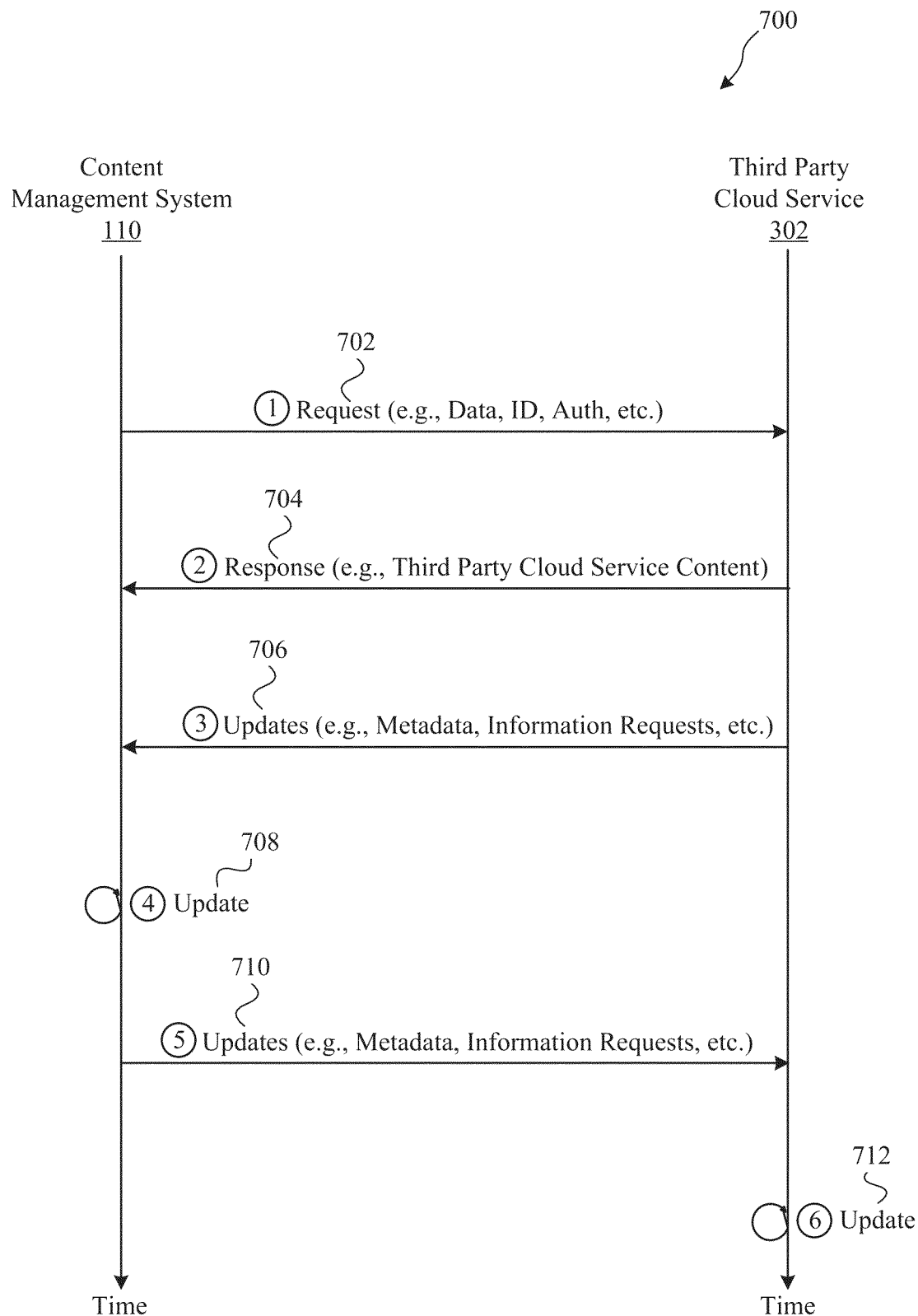
FIG. 7 shows an example flow for exchanging content, metadata and updates associated with a cloud service content item between a content management system and a third party cloud service.

FIG. 7 shows an example flow (700) for exchanging content, metadata and updates associated with third party cloud service content item 402 between content management system 110 and third party cloud service 302. In this example, content management system 110 sends request 702 to third party cloud service 302 for third party cloud service content item 402 and/or content or metadata associated with third party cloud service content item 402. Request 702 can include authentication information, a request for data associated with third party cloud service content item 402, an ID associated with third party cloud service content item 402, and/or other information associated with third party cloud service content item 402 such as a title, access permissions, sharing information, description information, metadata, etc.

Third party cloud service 302 receives request 702, verifies permissions and/or access to third party cloud service content item 402, and sends response 704 to content management system 110. Response 704 can include the content in third party cloud service content item 402 and any metadata associated with third party cloud service content item 402. In some examples, response 704 can include authentication information (e.g., an authentication token) for authenticating with content management system 110 and/or data (e.g., content, metadata, etc.) associated with third party cloud service content item 402. Content management system 110 can store the information in response 704 and/or use the information to create or store a preview of third party cloud service content item 402, create or store a canonical content item (e.g., 404) corresponding to third party cloud service content item 402, store or update metadata associated with third party cloud service content item 402 and/or a canonical content item corresponding to third party cloud service content item 402, store the content of third party cloud service content item 402, provide the content of third party cloud service content item 402 to one or more client devices for presentation or access, configure attributes (e.g., storage organization, access control permissions, content features, functionalities, etc.) associated with third party cloud service content item 402 or an associated canonical content item, extend the features or functionalities available for third party cloud service content item 402 based on features or functionalities provided by content management system 110, etc.

If third party cloud service 302 detects any changes in the content or metadata of third party cloud service content item 402, it can send updates 706 to content management system 110 to inform content management system 110 of such changes. Content management system 110 can use the information in updates 706 to perform update 708 at content management system 110. Content management system 110 can perform update 708 to implement any changes included in updates 706 or update associated information on content management system 110.

Similarly, if content management system 110 detects any changes in the content or metadata of third party cloud service content item 402 and/or an associated canonical content item (e.g., 404), it can send updates 710 to third party cloud service 302 to inform third party cloud service 302 of such changes. Third party cloud service 302 can use the information in updates 710 to perform update 712 at third party cloud service 302. Third party cloud service 302 can perform update 712 to implement any changes included in updates 710 on third party cloud service content item 402 at third party cloud service 302.

Figure 8:
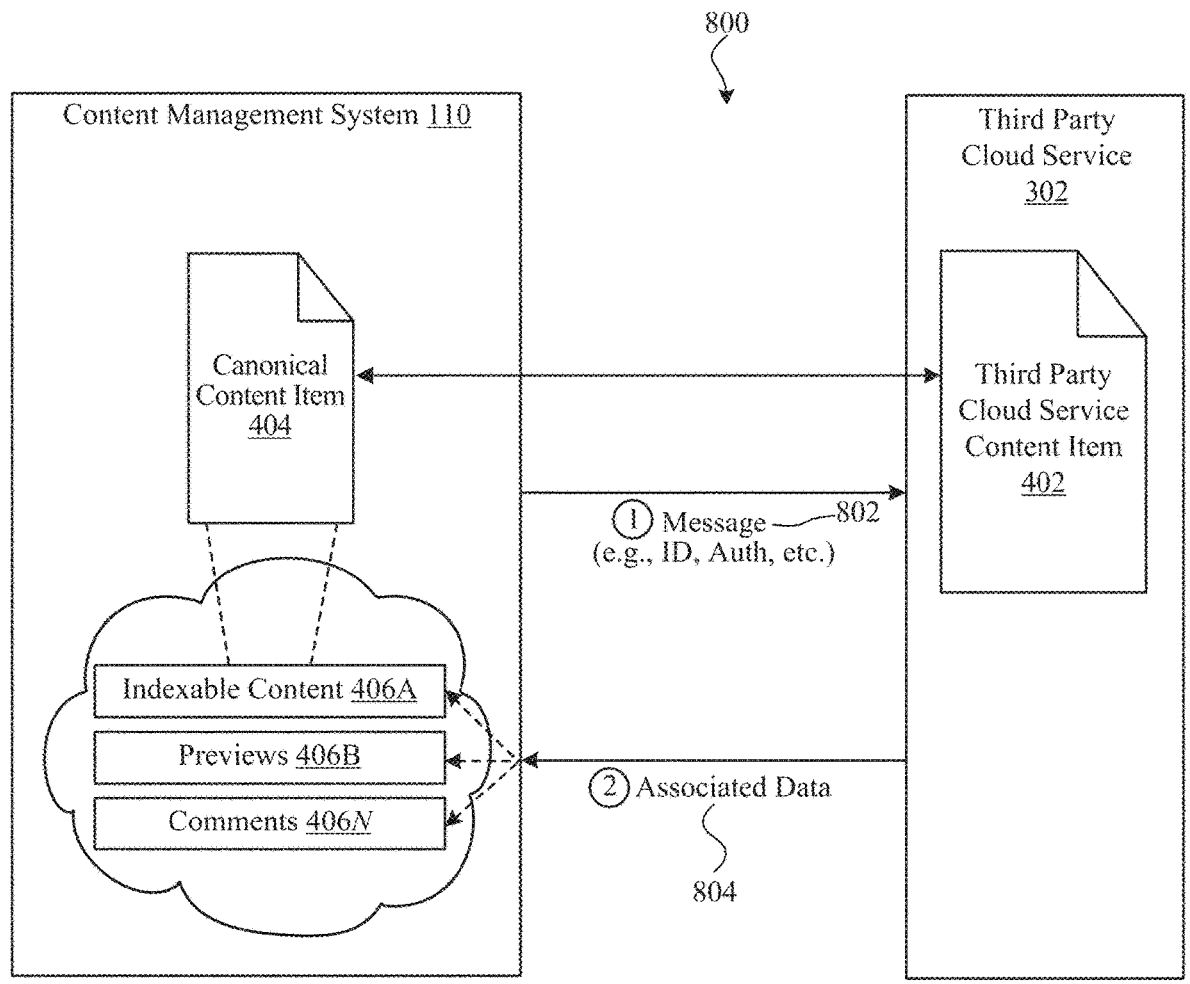
FIG. 8 shows an example flow for creating associations between content and metadata in a cloud service content item on a third party cloud service and a canonical content item in a content management system.

FIG. 8 shows an example flow (800) for creating associations between content and metadata in third party cloud service content item 402 on third party cloud service 302 and canonical content item 404 in content management system 110. In flow 800, content management system 110 can receive data from third party cloud service 302 that content management system 110 can use to associate canonical content item 404 (and any of its associated content or metadata) with third party cloud service content item 402 and third party cloud service 302, and store or create associated content or metadata for canonical content item 404, such as indexable content 406A, previews 406B, comments 406N, etc. Content management system 110 can also use the received data to do functionality mappings (e.g., 400) as previously described with respect to FIG. 4.

In flow 800, content management system 110 sends message 802 with authentication information to third party cloud service 302 in order to enable the exchange of data associated with third party cloud service content item 402. Message 802 can include, for example, an authentication token as well as other information associated with third party cloud service content item 402, such as a unique ID, a title, access control information, etc. Message 802 can request data or information associated with third party cloud service content item 402 from third party cloud service 302.

Third party cloud service 302 can receive message 802, authenticate with content management system 110, verify access to third party cloud service content item 402 and/or its associated data, and/or send associated data 804 to content management system 110. Associated data 804 can include content, metadata, and/or information associated with third party cloud service content item 402, which content management system 110 can use to create, store, and/or associate content or data with canonical content item 404.

For example, associated data 804 can include indexable content 406A associated with third party cloud service content item 402, which content management system 110 can use for indexing and to provide search functionality for canonical content item 404. Since in some cases content management system 110 may not store the actual content of third party cloud service content item 402 in canonical content item 404 (or elsewhere in content management system 110), content management system 110 may not otherwise have content associated with third party cloud service content item 402 available for indexing and searching. Thus, content management system 110 can receive indexable content 406A (e.g., via associated data 804) from third party cloud service 302 and use indexable content 406A for indexing and search functionalities.

In some cases, associated data 804 can include one or more previews 406B of third party cloud service content item 402 and/or content that content management system 110 can use to create previews 406B for canonical content item 404. Content management system 110 can store previews 406B for access by users. Previews 406B can be used to render a preview of canonical content item 404 (or the content associated with canonical content item 404 and third party cloud service content item 402).

In some examples, associated data 804 can include comments 406N associated with third party cloud service content item 402 and/or content within third party cloud service content item 402. Content management system 110 can associate comments 406N with canonical content item 404 and/or one or more portions of content associated with canonical content item 404, and store comments 406N for access by users interacting with canonical content item 404. In some cases, content management system 110 can provide comments 406N as notifications to users or may embed comments 406N in canonical content item 404 (or its associated content) or otherwise provide comments 406N along with canonical content item 404 when rendered or presented to a user.

In some cases, comments 406N can be anchored or unanchored. Anchored comments can refer to comments that are mapped or anchored to specific content in a document or file (e.g., canonical content item 404) and unanchored comments can refer to comments that are not mapped or anchored to specific content in a document or file (e.g., canonical content item 404) but rather mapped to or associated with the document or file as a whole. For example, a comment may be specific to a paragraph in a document or file (e.g., canonical content item 404). Accordingly, the comment can be mapped to or associated with that particular paragraph. Once mapped to or associated with the particular paragraph, the comment becomes an anchored comment as it is specifically anchored to the paragraph it pertains to.

However, in some cases, content management system 110 may not have enough information to determine which specific portion(s) of content within a document or file a comment pertains to. Accordingly, content management system 110 may not be able to anchor the comment to any specific portion(s) of the document or file, and instead maps or associates the comment with the document or file as a whole. For example, content management system 110 may have a comment received from third party cloud service 302 for third party cloud service content item 402, but may not have information identifying which specific portion(s) of content within third party cloud service content item 402 the comment pertains to. As a result, content management system 110 may not be able to map or anchor the comment to a specific portion(s) of the content in third party cloud service content item 402. Instead, content management system 110 may associate the comment with third party cloud service content item 402 (and/or canonical content item 404) as a whole.

As illustrated in flow 800, associated data 804 received from third party cloud service 302 can be used by content management system 110 to create associations between canonical content item 404 and content or metadata corresponding to canonical content item 404. Such associations can enable content management system 110 to provide or support various features and functionalities for canonical content item 404 and, in some cases, extend the features or functionalities of canonical content item 404 to include other features or functionalities made available through the ecosystem of content management system 110 and its own supported content, storage, collaboration, interaction, and other features and functionalities.

Figure 9:
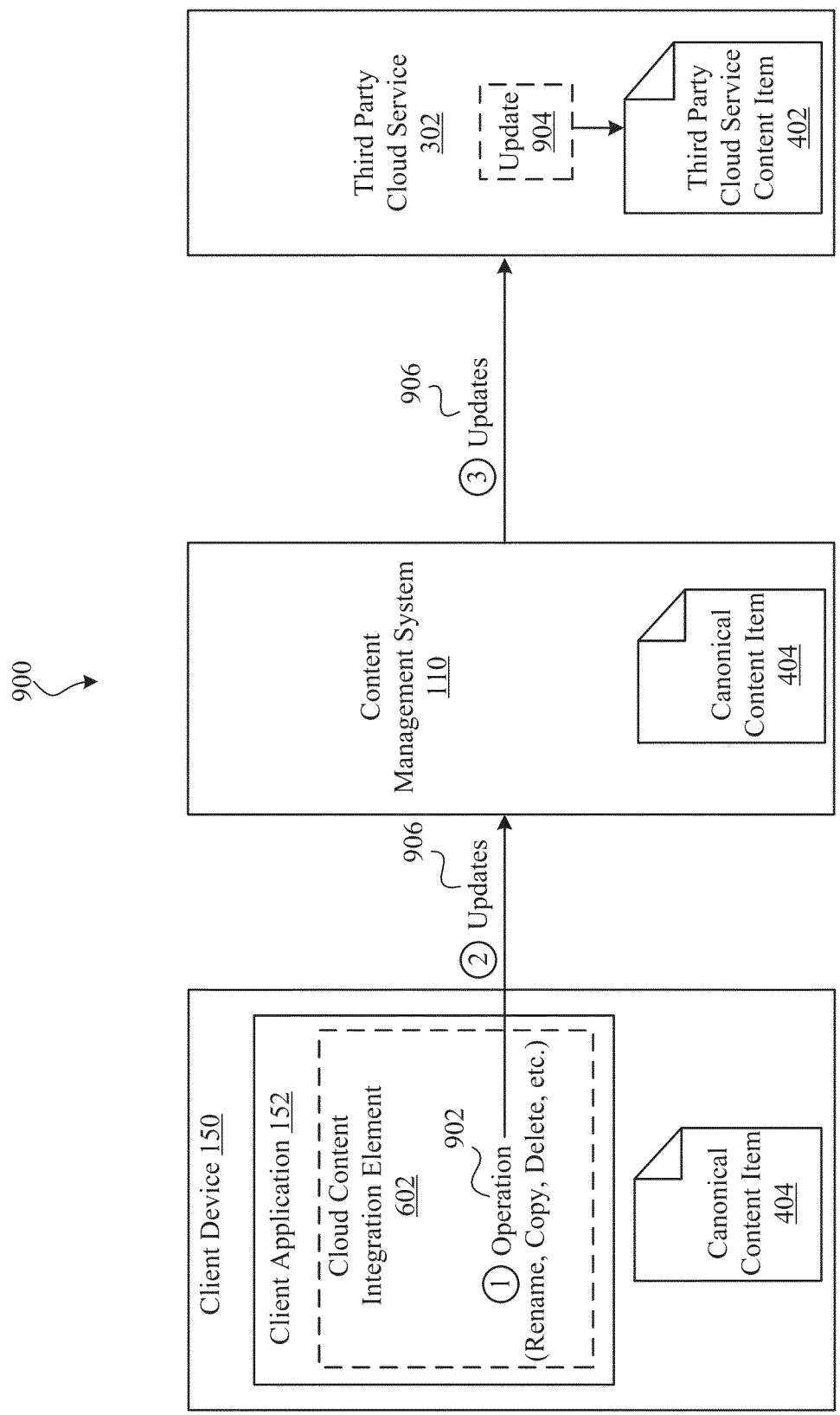
FIG. 9 shows an example flow for pushing local changes to cloud service content on a client device to a third party cloud service.

FIG. 9 shows flow 900 for pushing local changes to third party cloud service content on client device 150 (e.g., canonical content item 404) to third party cloud service 302. In flow 900, when client device 150 executes operation 902 resulting in changes to the content in third party cloud service content item 402 or associated metadata, it can send updates 906 identifying such changes to content management system 110. Content management system 110 can receive updates 906 and send them to third party cloud service 302. Third party cloud service 302 can receive updates 906 and use the information in updates 906 to update 904 third party cloud service content item 402 and/or its associated content or metadata to reflect the changes in updates 906.

Operation 902 can include any filesystem operation executed at client device 150 on content or metadata associated with third party cloud service content item 402. Non-limiting examples of operation 902 include a rename operation, a copy operation, a delete operation, an edit or write operation, a restore operation, an operation for reverting to a previous version of content, etc. Flow 900 allows any local changes to content or metadata associated with third party cloud service content item 402 resulting from operation 902 to be propagated to or synchronized with third party cloud service content item 402 on third party cloud service 302 so changes made to the content or metadata from client device 150 are not omitted from third party cloud service content item 402 on third party cloud service 302 (or any other devices with access to third party cloud service content item 402) and do not result in conflicting versions or copies on client device 150, content management system 110, and/or third party cloud service 302, and to provide a uniform or integrated user and content experience across client device 150, content management system 110, and third party cloud service 302.

Figure 10:
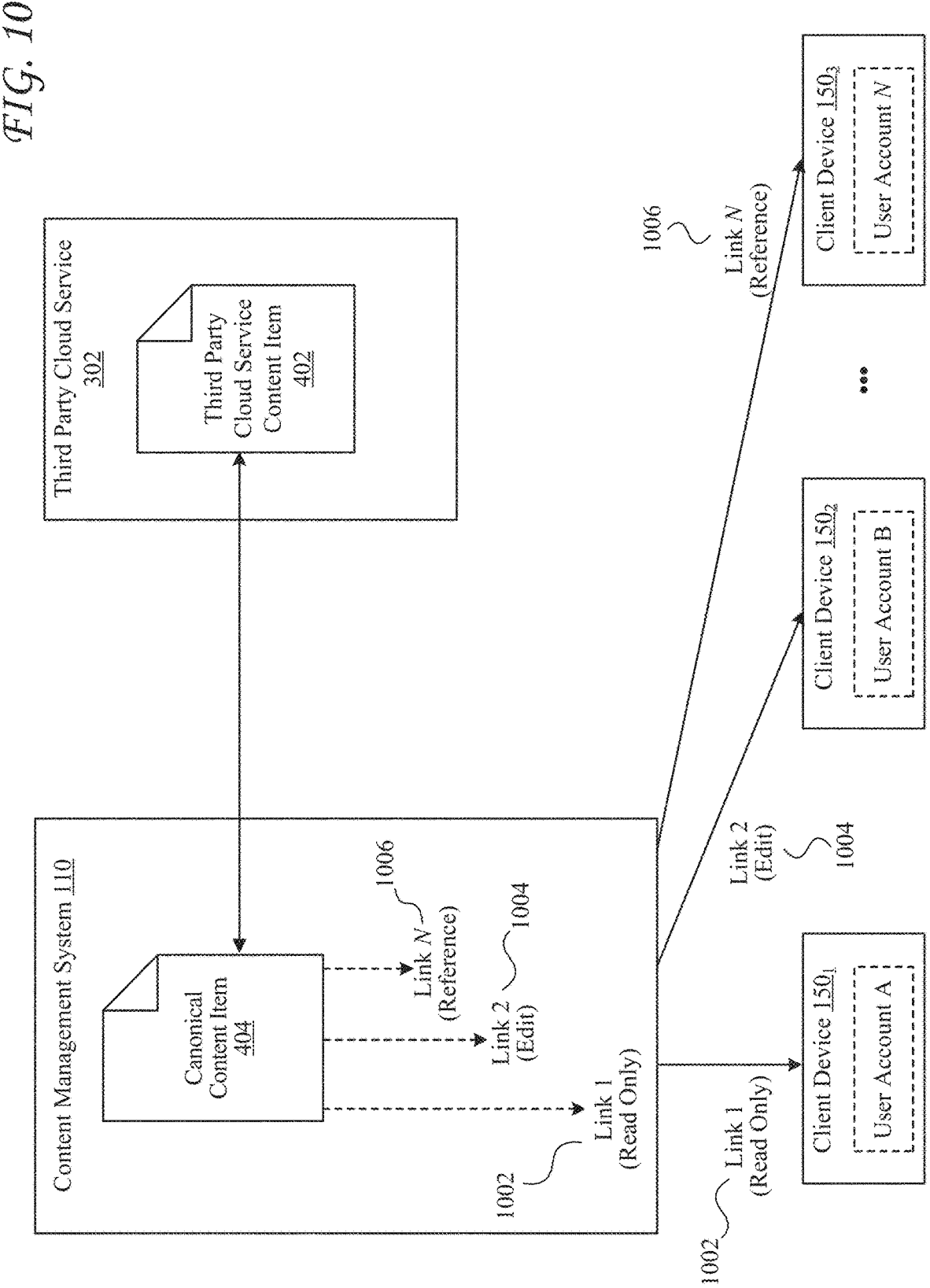
FIG. 10 shows an example link-based mechanism for sharing cloud-based content items stored in a content management system with users and devices.

FIG. 10 shows an example link-based mechanism for sharing cloud-based content items stored in content management system 110 with users and devices. In this example, content management system 110 can create links 1002, 1004, 1006 to canonical content item 404 that can be used to share canonical content item 404 with client devices $150_1$, $150_2$, $150_N$ and/or user accounts A, B, N. The links (1002, 1004, 1006) to canonical content item 404 can be configured with specific permissions so the links are pre-configured to provide a specific level of access to link recipients (e.g., client devices $150_1$, $150_2$, $150_N$).

For example, link 1002 can be a link configured to provide read-only access to canonical content item 404. Thus, when content management system 110 provides link 1002 to client device $150_1$, the user at client device $150_1$ will be able to use link 1002 to view or read the content associated with canonical content item 404 but will not be able to otherwise modify or edit the content. On the other hand, link 1004 can be configured to provide edit access or modification rights to canonical content item 404. Thus, when content management system 110 provides link 1004 to client device $150_2$, the user at client device $150_2$ will be able to use link 1004 to view/read and edit/modify the content associated with canonical content item 404.

The different links (1002, 1004) with different rights or permissions can be used to share different levels or types of access with client devices in order to provide greater sharing flexibility and granularity. The different links (1002, 1004) also allow access to be revoked from one link without affecting access through other links. For example, if content management system 110 revokes link 1002, those users and devices having link 1004 may not lose access to canonical content item 404 simply because link 1002 has been revoked. Likewise, if content management system 110 revokes link 1004, those users and devices having link 1002 may not lose access to canonical content item 404 simply because link 1004 has been revoked.

Link 1006 is a reference link that does not confer or provide any rights or permissions to canonical content item 404. Instead, link 1006 uniquely identifies canonical content item 404 and can be used to request access to canonical content item 404. Thus, when content management system 110 provides link 1006 to client device $150_3$, the user at client device $150_3$ will not be able to access canonical content item 404 from link 1006, but will rather be able to use link 1006 to request access to canonical content item 404.

Link 1006 can also provide a means for users to regain access to canonical content item 404 when links 1002 or 1004 are revoked. For example, if there is a security threat or unauthorized access resulting from an unauthorized user gaining access to link 1002, content management system 110 can revoke link 1002 to prevent unauthorized access to content through link 1002. When content management system 110 revokes link 1002, this can cause any users or devices that have a read-only link (e.g., link 1002) to canonical content item 404 to lose access to canonical content item 404. For example, when content management system 110 revokes link 1002, it can retroactively remove the read/view rights or permissions on all read-only links (e.g., 1002) to prevent unauthorized access to canonical content item 404 from any read-only link shared with users or devices. As a result, those users or devices with read-only links will lose access to the content.

However, in some cases, when content management system 110 revokes the read-only links (e.g., 1002) or removes the rights/permissions from the read-only links, it can downgrade the read-only links to reference links (e.g., 1006). The reference links (e.g., 1006) then allow those users or devices losing access as a result of the read-only links being revoked (or their rights/permissions removed) to use the reference links to request and regain access to canonical content item 404. Therefore, those users or devices will have a means to regain access to canonical content item 404 after the revocation of read-only links or the rights/permissions configured for those links.

Similarly, if content management system 110 revokes the edit links (e.g., 1004) or removes the rights/permissions from the edit links, it can downgrade the such links to reference links (e.g., 1006). As previously explained, the reference links (e.g., 1006) allow those users or devices losing access as a result of the edit links being revoked (or their rights/permissions removed) to use the reference links to request and regain access to canonical content item 404. The users or devices will thus have a means to regain access to canonical content item 404 after the revocation of the edit links (e.g., 1004) or the rights/permissions configured for those links.

Figure 11:
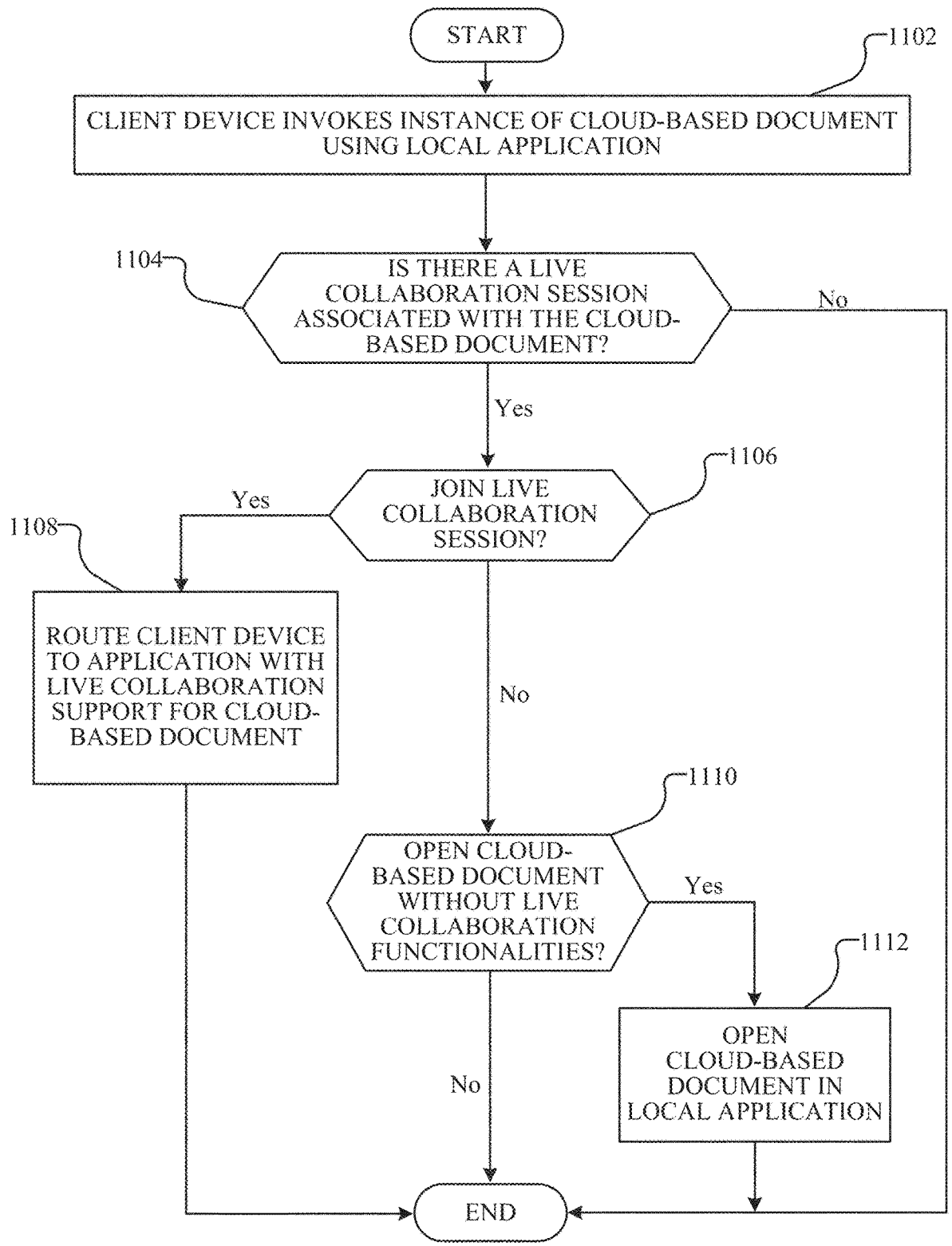
FIG. 11 shows an example flow for routing users to live collaboration sessions.

FIG. 11 shows an example flow for routing users to live collaboration sessions. In some cases, a user may want to open a cloud-based document (e.g., third party cloud service content item 402) in an application that does not support collaboration functionalities or is not compatible with the collaboration functionality of the cloud-based document. If there are is a live collaboration session between users interacting and working on the cloud-based document, the user will not be able to participate in the live collaboration session with such users or access the activity and services generated for the cloud-based document in the collaboration session. The user will thus have a limited experience and will lose the benefits of the collaborative experience otherwise available for the cloud-based document. The example flow in FIG. 11 allows such a user to be given an option to access the cloud-based document using the application that does not support the collaboration functionalities and an option to be routed to another application (e.g., client application 152 or browser application 166 configured to employ cloud content integration element 602) that does support such collaboration functionalities and join the collaboration session.

Starting at step 1102, client device 150 invokes an instance of a cloud-based document (e.g., third party cloud service content item 402) using a local application on the client device 150 that does not support collaboration functionalities or is not compatible with the collaboration functionalities of the cloud-based document.

At step 1104, the flow involves determining whether there is a live collaboration session associated with the cloud-based document. The live collaboration session can include multiple users editing and/or interacting with the cloud-based document in a collaborative manner (e.g., in a manner which allows each user to see changes and activity generated by other users). If there are no live collaboration sessions associated with the cloud-based document, the flow can end and the user may proceed as desired by opening and working on the cloud-based document using the local application or otherwise abandoning the process. On the other hand, if there is a live collaboration session associated with the cloud-based document, the flow can proceed to step 1106.

At step 1106, the user can be given an option to join the live collaboration session. If the user chooses to join the live collaboration session, at step 1108 the client device 150 associated with the user can be routed to an application with live collaboration support for the cloud-based document, which the user can use to join the live collaboration session. For example, the client device 150 can be routed to client application 152 or browser application 166 which can implement cloud content integration element 602 to provide collaboration support for the cloud-based document and allow the user to join the live collaboration session. As another example, the client device 150 can be routed to a cloud-based application or document editor, such as third party cloud service application 504, that supports collaboration for the cloud-based document and allows the user to join the live collaboration session.

On the other hand, if at step 1106 the user chooses not to join the live collaboration session, the user can be presented with an option to proceed without live collaboration functionalities. Thus, at step 1110, the user is provided an option to open the cloud-based document from the local application without live collaboration functionalities. If the user at step 1110 chooses to open the cloud-based document without live collaboration functionalities, at step 1112 the client device 150 can proceed to open the cloud-based document in the local application without live collaboration functionalities. If the user at step 1110 instead chooses not to proceed opening the cloud-based document without live collaboration functionalities, the flow ends and the user can optionally return to step 1102 at any point.

Figure 12:
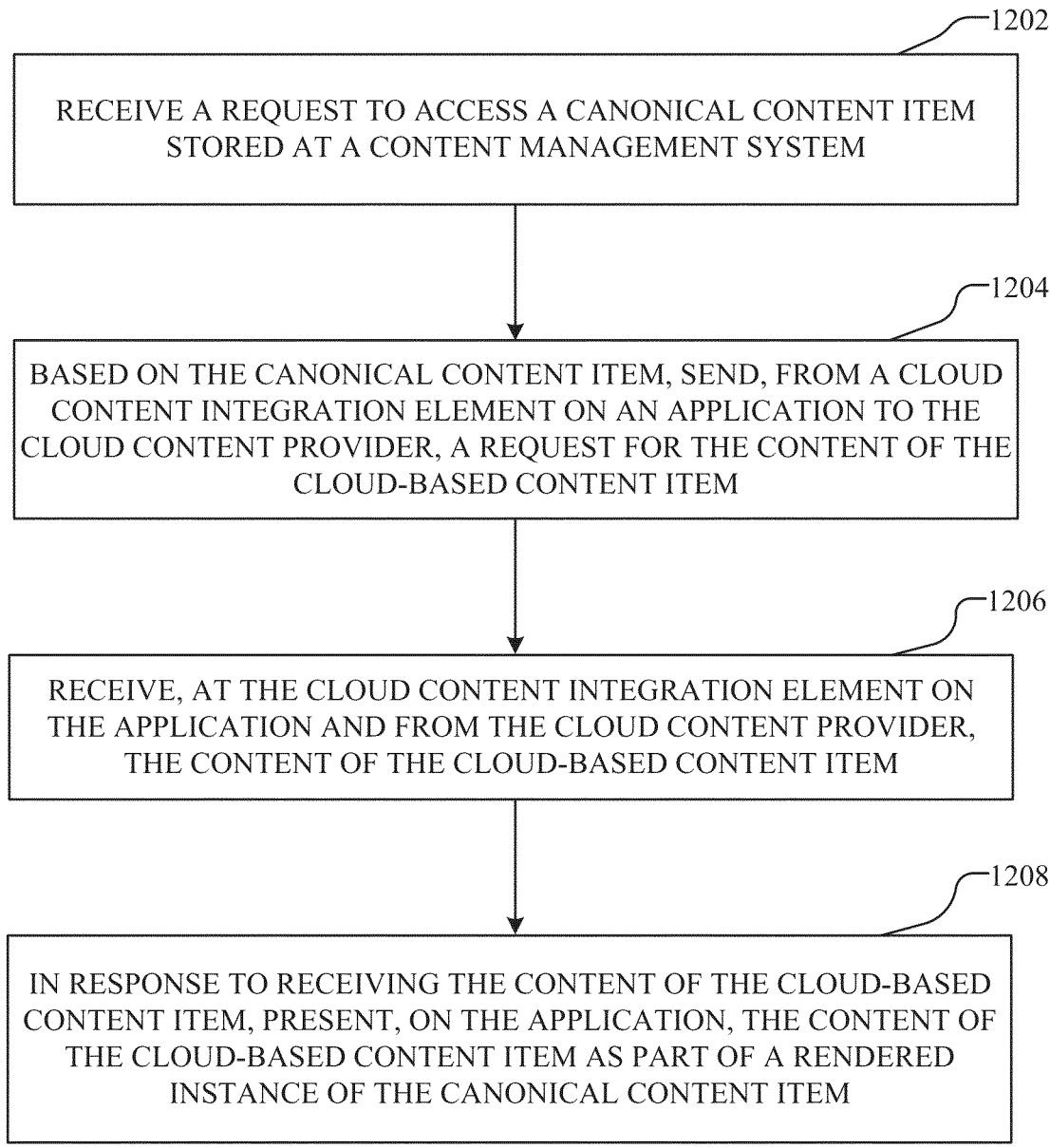
FIG. 12 shows an example method for integrating cloud documents with a content management system.

Having disclosed example system components and concepts, the disclosure now turns to the example method for integrating cloud documents with a content management system (110), as shown in FIG. 12. The steps outlined herein are non-limiting examples provided for illustration purposes, and can be implemented in any combination thereof, including combinations that exclude, add, or modify certain steps.

At step 1202, the method can include receiving a request to access a canonical content item (e.g., 404) stored at a content management system (e.g., 110). The canonical content item can include a representation of a cloud-based content item (e.g., third party cloud service content item 402) stored at a cloud content provider (e.g., 302, 304, 306, or 170). The content and features of the cloud-based content item can be accessed through an online application (e.g., third party cloud service application 504) associated with the cloud content provider. The online application can include, for example, an online or web application or editor from the cloud content provider. Moreover, the online application can be configured to provide native support for the cloud-based content item, including the content and features of the cloud-based content item. In some cases, the content and features of the cloud-based content item may only be accessible or supported through the online application.

The canonical content item can be stored at a user account (e.g., 604) registered at the content management system (110). The user account can include the canonical content item as well as a plurality of other content items such as folders, images, videos, documents, audio content items, files, collections, and/or any other type of digital data. In some aspects, the content items on the user account can be stored on the content management system (110) as well as one or more client devices (e.g., 150). Moreover, one or more of the content items (and/or associated changes) on the user account can be synchronized between the content management system (110) and the one or more client devices (e.g., 150) in order to maintain a consistent copy of the content items across the content management system (110) and the one or more client devices (e.g., 150).

The canonical content item (404) can be stored without the actual content of the cloud-based content item. Instead, the content can be retrieved from the cloud content provider when the canonical content item is invoked or opened as described herein. However, in some cases, the canonical content item (404) may include the actual content of the cloud-based content item or may be stored with the actual content.

Moreover, in some cases, the canonical content item (404) can be stored along with other content items on a user account and according to a filesystem storage scheme or other organization scheme for storing the canonical content item and any other content items on the user account. For example, the canonical content item can be stored with other content items in a hierarchical file system or storage scheme, and visually depicted in storage as a file or document.

At step 1204, the method can include, based on the canonical content item (404), sending, from a cloud content integration element (e.g., 602) on a local application (e.g., client application 152 or browser application 166) to the cloud content provider (e.g., 302, 304, 306, or 170), a request (e.g., 610, 628, 702) for the content of the cloud-based content item (e.g., 402). In some examples, the request for the content can include a unique ID associated with the content or the cloud-based content item, authentication information, a title of the cloud-based content item, access control permissions configured at the content management system (110) for the canonical content item, the content, and/or the cloud-based content item. The access control permissions can correspond to a user account (e.g., 604) that is associated with the request for the content and registered at the content management system (110).

In some aspects, the local application may not provide native support the cloud-based content item, the content in the cloud-based content item, and/or features or functionalities associated with the cloud-based content item. Instead, the local application may implement the cloud content integration element (e.g., 602) to provide support for the cloud-based content item, the content in the cloud-based content item, and/or features or functionalities associated with the cloud-based content item. The features or functionalities can include one or more features or functionalities provided by the cloud content provider and accessible through the online application (e.g., 504) associated with the cloud content provider. Non-limiting examples of features or functionalities associated with the cloud-based content item can include commenting, notifications, bi-directional communications or interactions between users working on the cloud-based content item, live editing or collaboration sessions, tasks, editing, sharing, activity feeds, content or metadata updates, etc.

At step 1206, the method can include receiving, at the cloud content integration element (e.g., 602) on the local application (e.g., 152 or 166) and from the cloud content provider (e.g., 302, 304, 306, or 170), the content of the cloud-based content item (e.g., 402). In some cases, the cloud content integration element (e.g., 602) can also receive other content or data associated with the cloud-based content item, such as indexable content, a content or document preview, metadata (e.g., comments, tasks, state, events, updates, user activity information, status information, etc.), and/or any other data or information associated with the cloud-based content item.

At step 1208, the method can include, in response to receiving the content of the cloud-based content item (e.g., 402), presenting, on the local application (e.g., 152 or 166), the content of the cloud-based content item as part of a rendered instance (e.g., 502) of the canonical content item (404). The content can be presented within the rendered instance of the canonical content item so as to mirror or resemble the cloud-based content item when rendered or displayed for a user.

The cloud content integration element (e.g., 602) on the local application and/or the content management system (110) can allow data (e.g., content, metadata, events, etc.) added or modified on the cloud-based content item in the cloud content provider to be implemented on the canonical content item (404) and vice versa. For example, if a user renames the cloud-based content item on the cloud content provider, the cloud content provider can propagate the change to the canonical content item (404) by sending an update to the cloud content integration element (e.g., 602) and/or the content management system (110). When the cloud content integration element (e.g., 602) and/or the content management system (110) receives the update from the cloud content provider, the cloud content integration element (e.g., 602) or the content management system (110) can rename the canonical content item (404) accordingly to match the renaming of the cloud-based content item.

The cloud content integration element (e.g., 602) and/or the content management system (110) can also enable collaborative functionalities and live editing or collaboration sessions between users working on the canonical content item (404) and the cloud-based content item on the cloud content provider. For example, the cloud content integration element (e.g., 602) and/or the content management system (110) can communicate with the cloud content provider to exchange information and communications, thereby providing support for bi-directional or two-way communications between the canonical content item (404) and the cloud-based content item on the cloud content provider.

To illustrate, comments or messages created from, or added to, the cloud-based content item on the cloud provider can be propagated to the canonical content item (e.g., via the cloud content integration element and/or the content management system) so a user working on the canonical content item (404) can view or interact with the comments or messages created from, or added to, the cloud-based content item and received from the cloud content provider, and vice versa. A user working on the canonical content item (0.404) can receive or view the comments or messages from the rendered instance of the canonical content item and reply to the comments or messages from the canonical content item. Any replies added by the user from the canonical content item can be similarly propagated to the cloud-based content item on the cloud content provider so any users working on the cloud-based content item can receive and view such replies. Such collaborations and interactions between users can be exchanged and implemented between the canonical content item and the cloud-based content item to provide an integrated, collaborative experience across all platforms (e.g., the content management system, the local application, the cloud content provider, etc.).

In some aspects, the local application can perform filesystem operations (e.g., 902) and/or other file or content operations on the canonical content item, such as copy operations, move operations, create operations, delete operations, purge operations, restore operations, rename operations, version history operations, sharing operations, etc. The local application can propagate any changes resulting from such operations to the cloud-based content item on the cloud content provider. For example, the local application can implement the cloud content integration element (e.g., 602) to send updates (e.g., 616, 640, 906) to the cloud content provider with the changes from the operations, which the cloud content provider can use to update the cloud-based content item on the cloud content provider. The changes can include, for example, changes to the cloud-based content item, changes to metadata of the cloud-based content item, changes to the content of the cloud-based content item, etc.

In some cases, the method can include receiving, at the cloud content integration element (e.g., 602) on the local application and from the cloud content provider, metadata identifying a comment added to the cloud-based content item (e.g., 402) stored on the cloud content provider, and presenting, on the local application, the comment with the rendered instance of the canonical content item. The comment can be a comment added by a remote user working on the cloud-based content item from the cloud content provider or a remote user working on a rendered instance of another copy of the canonical content item. Moreover, the comment can be presented within the rendered instance of the canonical content item, within a separate user interface or application, or within a message or notification to the user of the local application. Thus, a user viewing or working on the rendered instance of the canonical content item can receive or view comments added to the cloud-based content item by other users and thereby obtain a collaborative experience when accessing or working on the rendered instance of the canonical content item.

In some cases, the local application can receive one or more comments added to the rendered instance of the canonical content item from the local application and propagate the one or more comments to the cloud content provider for inclusion or implementation in the cloud-based content item on the cloud content provider. For example, when the local application receives a comment added by a user working with the rendered instance of the canonical content item at the local application, it can use the cloud content integration element (e.g., 602) to send an update message (e.g., 616, 640) to the cloud content provider. The update message can identify the comment added by the user to the rendered instance of the canonical content item. The cloud content provider can receive the update message and apply or add the comment from the update message to the cloud-based content item on the cloud content provider. This way, comments added to the cloud-based content item on the cloud content provider and comments added to the rendered instance of the canonical content item can be exchanged between the local application and the cloud content provider to provide a collaborative experience and maintain consistency between the cloud-based content item on the cloud content provider and the canonical content item.

In some cases, the cloud content integration element (e.g., 602) on the local application can receive, from the cloud content provider, data associated with the cloud-based content item, such as metadata (e.g., comments, activity, events, tasks, document information, update information, etc.) associated with the cloud-based content item, one or more previews (e.g., a content or document preview such as a text or image preview), indexable content (e.g., text, image, and/or other digital content that can be indexed for searching) corresponding to the cloud-based content item, etc. The data from the cloud content provider can be presented by the local application as part of the rendered instance of the canonical content item, displayed on a separate interface, presented on a message or notification, depicted in storage (e.g., as a file or document in storage), etc. Moreover, in some cases, the data or portions of the data can be indexed for searching.

For example, the local application can receive a search request from a user which includes a query for a portion of the data and, in response to the search request, the local application can search any indexed data on the user's account (e.g., 604) for the portion of the data associated with the search request. The local application can then present a search result to the user including any matches or, if no matches are found, an indication that no matches were found.

In some cases, the data associated with the cloud-based content item can include a preview of the cloud-based content item and/or an indication of user activity associated with the cloud-based content item. The user activity can include any interactions between a user(s) and the cloud-based content item, any events generated by a user(s) working on the cloud-based content item, etc. The preview can include, for example, a preview (e.g., an image preview, a text preview, a file preview, etc.) of the cloud-based content item or one or more portions of content in the cloud-based content item.

The local application can present the preview and/or the user activity to a user having access to the canonical content item or viewing/working on the rendered instance of the canonical content item. For example, the local application can display an activity feed or activity notification identifying the user activity. In some examples, the preview can be stored in the user's account (e.g., 604) and depicted as a file, document, or content item in storage. The user can view the preview from storage without having to access the cloud-based content item or obtain a rendered instance of the canonical content item. Moreover, the preview can be used by the user's device (e.g., 150) or the content management system (110) to search for content associated with the cloud-based content item.

In some cases, the method can include receiving a request to open a copy of a specific cloud-based content item (e.g., any cloud-based content item on any cloud content provider) using a specific application that is different from an online application or editor that is associated with the specific cloud-based content item and provides native support for the specific cloud-based content item and its associated content and features/functionalities. The method can further include identifying a live collaboration session between users interacting with the specific cloud-based content item (e.g., via respective client devices) and determining that the specific application does not support live collaboration for the copy of the specific cloud-based content item. The method can also include providing a prompt to the requesting user or device with an option to join the live collaboration session via a different application that supports live collaboration for the specific cloud-based content item, and in response to receiving an acceptance of the option to join the live collaboration session, routing the requesting user or device to the different application and/or joining the requesting user or device to the live collaboration session via the different application.

In some cases, the method can also include generating a plurality of sharing links to the canonical content item (404), where the sharing links can be configured with various access rights, and using the sharing links to share the canonical content item with users and provide such users a specific level of access to the canonical content item. For example, the plurality of sharing links can include a view link (e.g., 1002) configured with read-only access rights to the canonical content item (404), an edit link (e.g., 1004) configured with edit access rights to the canonical content item (404), and/or a reference link (e.g., 1006) that uniquely identifies the canonical content item (404) and confers no access rights to the canonical content item (404). The method can involve providing the sharing links to a plurality of client devices or users in order to share the canonical content item (404) with such client devices or users.

If a security threat associated with a shared link is detected, such as unauthorized access to a link, the method can include retroactively revoking the associated access rights from the shared link (and/or any copies of the shared link) and/or downgrading the shared link to a reference link (e.g., 1006) in order to prevent unauthorized access to the canonical content item (and/or its associated content) and mitigate the security threat. The reference link (e.g., 1006) can be used by any users or devices that have rightful access to the shared link or are authorized use the shared link, which have since lost any access conferred by the shared link as a result of the revocation of associated access rights and/or the downgrading of the shared link to a reference link, to request and regain access to the canonical content item. For example, the user can send an access request including the reference link to the content management system (110), which can then provide the user with another link having the requested access rights or convert the reference link to a link configured with the requested access rights, such as a view link (e.g., 1002) or an edit link (e.g., 1004).

A user on user device 150 may also create content items (e.g., canonical content items, third party cloud service content items 402, local content items on user device 150, content items associated with content management system 110 or collaborative content management system 170, etc.). For example, the content items may be created using browser application 166 or client application 152. However, creating content items using browser application 166 or client application 152 involves a user searching, waiting, and a relatively large and complex number of steps. For example, a user must locate browser application 166 or client application 152, launch browser application 166 or client application 152, wait for browser application 166 or client application 152 to open, and navigate through the various interfaces on browser application 166 or client application 152 to locate the appropriate interface elements configured to create the desired content item.

Various aspects of the subject technology address various technical problems and issues with user interface technology and provide an improved user interface for creating content items of various types. The user interface provides an improved user experience where a user is able to create a content item from a persistent user interface located on an operating system desktop of a client device. The content item creation functionality on the persistent user interface of the operating system desktop allows the user to become familiar with the location of where they can create content items of various types and allows the user to create content items without having to open an application (e.g., browser application 166 or client application 152) and all the steps associated with creating a content item via the application. Furthermore, in some aspects, multiple different types of content items associated with different applications and/or external services (e.g., cloud content management systems) may be created using the same interface. As a result, the user does not need to learn the location of the different applications and/or services and how to create each type of content item. Instead, the same interface may be used to create a variety of content items.

Figure 13:
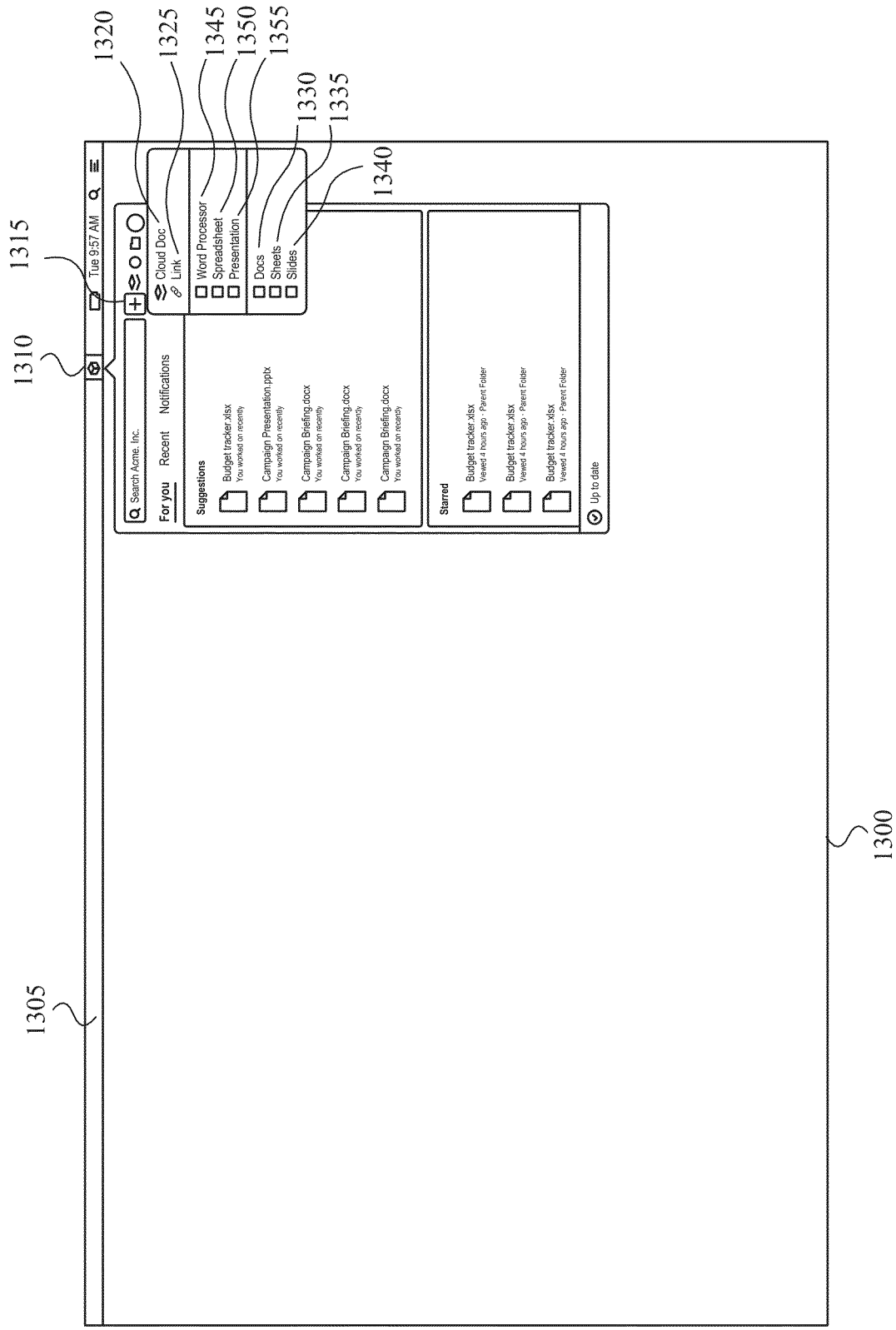
FIG. 13 shows an example graphical user interface, in accordance with various embodiments of the subject technology.

FIG. 13 shows an example graphical user interface 1300, in accordance with various embodiments of the subject technology. The graphical user interface 1300 may be an operating system desktop interface provided by the operating system (e.g., a version of Windows, Linux, Mac OS, etc.) of the client device. The graphical user interface 1300 includes a persistent user interface 1305 that is readily accessible on the operating system desktop. For example, the persistent user interface 1305 may always appear on the operating system desktop, appear on top of any other interface on displayed on the operating system desktop, and/or be accessible by the user pressing a key and or navigating to a particular part of the screen. In some examples, the persistent user interface 1305 may be a system tray for a version of the Microsoft Windows operating system or Linux operating system or a menu bar for a version of the Macintosh operating system (e.g., Mac OS).

The persistent user interface 1305 may include an interface element 1310 (e.g., an icon button) that, when selected by a user, provides the user with one or more options including the ability to create a content item. The interface element 1310 may be provided by a process running on a client device. The process may be, for example, associated with a client application (e.g., client application 152 in FIG. 1A) or service (e.g., client synchronization service 156 or client collaboration service 160). The process may be configured to interface with the file system on the client device, a content management system (e.g., content management system 110 of FIG. 6A), and/or one or more third party services (e.g., third party cloud service 302 of FIG. 6A) to manage content items stored on the file system of the client device, the content management system, and/or the third party services.

In FIG. 13, the options provided in response to a user selection of interface element 1310 include a content creation interface 1315 where content items of different types can be created. The content creation interface 1315 may provide options to create a content item of a particular type (e.g., content items types 1320 and 1325) associated with a content management system (e.g., content management system 110 of FIG. 6A), a content item of a particular type (e.g., content items types 1330, 1335, and 1340) associated with one or more third party services (e.g., third party cloud service 302 of FIG. 6A), or a content item of a particular type (e.g., content items types 1345, 1350, and 1355) associated with an application (e.g., a document processing application, a spreadsheet application, a slide application, etc.) installed on the client device.

Upon selection of one of the options to create a content item of a particular type, the process running on the client device may initiate the creation of the content item. According to some aspects of the subject technology, if the user selects the option to create a content item associated with a content management system or a third party service (e.g., a cloud storage service), the process may be configured to interface with the content management system or third party service to create the content item on the content management system or third party service. For example, the process may transmit instructions to the content management system (or third party service) to create the content item and receive a notification from the content management system that the content item has been created. The notification from the content management system may include a content identifier, link, or other reference to the created content item so that the process may track the content item for future usage (e.g., to open the content item). If the user selects the option to create a content item locally on the client device and/or a content item associated with an application installed on the client device (e.g., a document processing application, a spreadsheet application, an image editor application, etc.), the process may be configured to interface with the file system on the client device to create the content item locally on the client device.

According to some aspects of the subject technology, the process running on the client device may be configured to automatically open the content item after the content item is created. For example, the process can retrieve the content item from the local file system on the client device, the content management system, or the third party service and open the content item in browser application 166 or client application 152. In some aspects, the process may determine which application to open based on a registry stored on the client device. The registry may contain an association of file types or file extensions to corresponding applications installed on the client device. In other aspects, the process may alternatively or additionally request and retrieve information about what application or service to use to open a particular content item or content item type from the content management system. For example, the process may first check the registry on the client device if there is an application installed on the client device is specified for the particular content item type. If an association between the content item type and an application on the client device is not specified, the process may request information from the content management system. The content management system may specify another application on the client device, an application or service accessible to the content management system, or an external application or service (e.g., a web site or cloud service). The process may use the information received from the content management system to open the content item and, in some cases, update the registry stored on the client device.

In accordance with various aspects of the subject technology, the created content item may also be synchronized across various other locations. For example, if the content item is created locally in a location on the client device (e.g., a synchronized folder) that is configured to be synchronized with a content management system, the process may be configured to perform the synchronization process with the content management system so the local version of the content item can be synchronized with a version of the content item on the content management system and/or other client devices that are to be synchronized with the local client device. If the content item is created remotely on a content management system, the process may be configured to interact with the content management system in order to retrieve and store a synchronized version of the content item in a location on the client device that is configured to be synchronized with the content management system (e.g., a synchronized folder).

By providing content item creation interface 1315 on the persistent user interface 1305 on the operating system desktop, a user is able to create content items more directly with fewer steps, less time (e.g., time locating the correct interface elements, time waiting for an application to load, etc.), and/or less distance traversed across the desktop interface.

Figure 14:
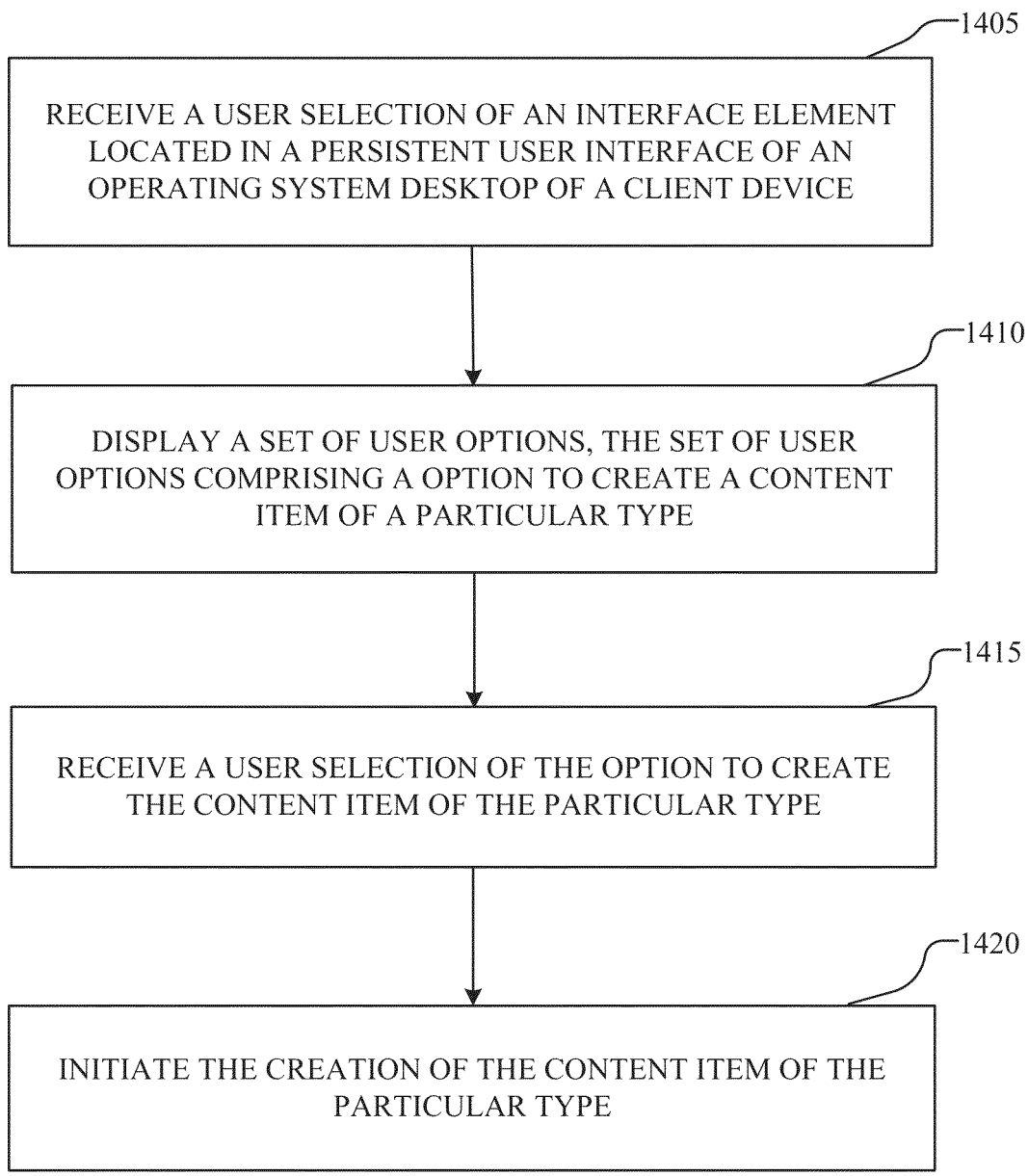
FIG. 14 shows an example method for initiating the creation of a content item, in accordance with various embodiments of the subject technology.

FIG. 14 shows an example method 1400 for initiating the creation of a content item, in accordance with various aspects of the subject technology. The steps outlined herein are non-limiting examples provided for illustration purposes, and can be implemented in any combination thereof, including combinations that exclude, add, or modify certain steps. In some aspects, the method 1400 may be performed by client device and/or, more specifically, a process running on a client device. The process may be, for example, associated with a client application (e.g., client application 152 in FIG. 1A) or service (e.g., client synchronization service 156 or client collaboration service 160). The process may be configured to interface with the file system on the client device, a content management system (e.g., content management system 110 of FIG. 6A), and/or one or more third party services (e.g., third party cloud service 302 of FIG. 6A) to manage content items stored on the file system of the client device, the content management system, and/or the third party services.

At operation 1405, the client device receiving a user selection of an interface element located in a persistent user interface of an operating system desktop of a client device. As noted with respect to FIG. 13, the persistent user interface 1305 may be a system tray for a version of the Microsoft Windows operating system or Linux operating system or a menu bar for a version of the Mac OS. Persistent user interface 1305 may include an interface element 1310 (e.g., an icon button) that, when selected by a user, provides the user with one or more options including the ability to create a content item. For example, at operation 1410, the client device displays a set of user options in response to the user selection of interface element 1310.

As is evident in graphical user interface 1300 of FIG. 13, a variety of user options may be displayed in response to the user selection of interface element 1310. The user options may include opening one or more recently accessed content items, suggested content items, or prioritized content items (e.g., starred or bookmarked content items). The user options may also include opening client application 152 associated with a content management system or browser application 166 to a particular website associated with a content management system or third party service. The set of user options may also include one or more options to create content items of various types. For example, in FIG. 13, the options include content creation interface 1315 where content items of different types can be created. The content creation interface 1315 may provide options to create content items associated with a content management system, content items associated with one or more third party services, or content items associated with an application installed on the client device.

Figure 15:
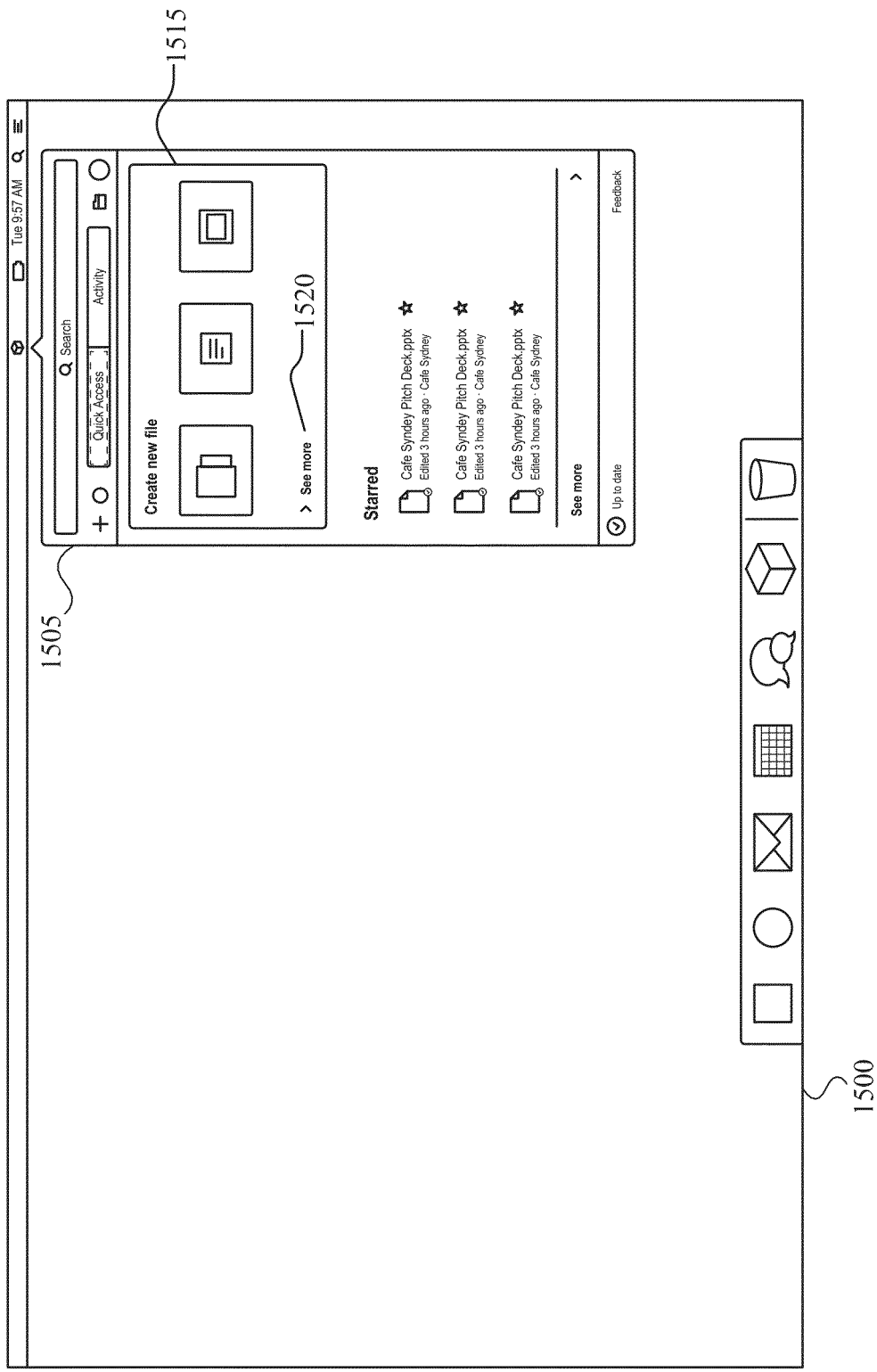
FIG. 15 shows an example graphical user interface that includes another variation of a content creation interface, in accordance with various embodiments of the subject technology.

FIG. 15 shows an example graphical user interface 1500 that includes another variation of a content creation interface, in accordance with various embodiments of the subject technology. Graphical user interface 1500 includes window 1505 that is displayed in response to a user selection of interface element 1510 (e.g., an icon associated with a content management system). Window 1505 includes content creation interface 1515 where content items of different types can be created.

In some cases, there may be a large number of content item types that may be created. However, there may not be enough space to effectively display all of the content item types to the user without overwhelming the user. Accordingly, in some aspects of the subject technology, a subset of all the content item types may be selected based on various metrics, algorithms, and combinations of techniques. For example, some metrics may include most frequently used content item types by the user or a group of users, most recently used content item types by the user or a group of users, user preferences, default content item types, etc. Various machine learning techniques may also be used to select a subset of content item types to create in content creation interface 1515. Additional content item types may be displayed by user selections of the "see more" option 1520.

Returning to FIG. 14, at operation 1415, the client device receives a user selection of an option to create a content item and, at operation 1420, initiates the creation of the content item. Depending on the type of content item to be created and/or where the content item is to be created, the client device may work with the content management system, third party service, and/or the local file system to create the content item. The content creation process may include obtaining additional input from the user including, for example, a name for the new content item, a location (on the content management system, third party service, and/or the local file system) to store the new content item, and any other information that may be needed to create the content item.

Figure 16:
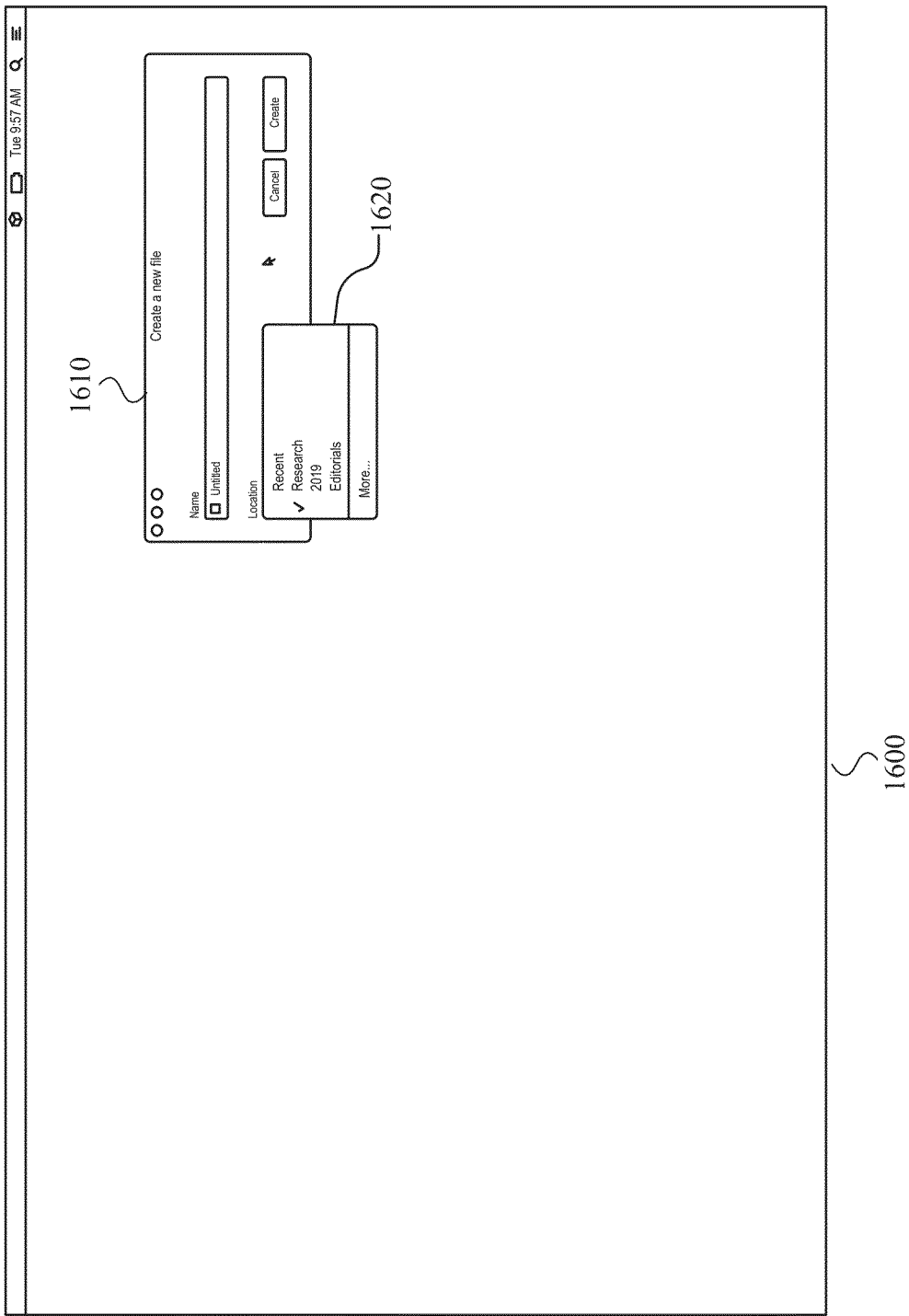
FIG. 16 shows an example graphical user interface for obtaining additional user input, in accordance with various embodiments of the subject technology.

FIG. 16 shows an example graphical user interface 1600 for obtaining additional user input, in accordance with various embodiments of the subject technology. After the client device receives a user selection of an option to create a content item, the client device may display user interface 1610 that allows the user to specify a name for the new content item and a location to store the new content item. A user can use a dropdown menu 1620 to select from previously used locations, suggested locations, default locations, or specify another location to store the content item.

According to some aspects of the subject technology a number of validation checks may be performed on the additional input provided by the user. For example, the client device can check whether the location specified by the user is a valid location, a location that is configured to be synchronized with a content management system, a location that is shared with other accounts of the content management system, or other location checks. The location checks may also be performed with the participation of the content management system and/or third party service to determine whether the content management system and/or the third party service have any issues with the location specified by the user. Warnings and/or notifications of potential issues may be provided to the user. The client device can also perform checks on the name provided by the user to make sure that the specified name is a valid name, is not a duplicate, or other checks. Again, the name checks may be performed with the participation of the content management system or a third party service if the location of the content item is associated with the content management system or third party service.

Once the information used to create the content item is obtained from the user, the client device can continue with the content creation process. For example, if the content item to be created is associated with an external service (e.g., the content management system or third party service), the client device is configured to transmit instructions to create the content item to the external service. The instructions may include the information provided by the user (e.g., the name of the content item and the location the content item is to be stored), the content item type, sharing information, digital content for the content item, or other information. The external service receives the instructions, creates the content item using the information specified in the instructions, and sends an acknowledgement or confirmation of the content creation back to the client device. In some cases, the acknowledgement or confirmation notification may include a URL, link, or identifier for the created content item that can be used by the client device to open the created content item. If the content item is to be created locally, the client device is configured to access the file system of the client device, identify the appropriate location to create the content item, and create the content item locally at that location. After the content item is created either locally or externally, the content item may be synchronized to one or more appropriate destinations.

Although some examples of content creation interfaces have been illustrated with respect to FIG. 13 and FIG. 15, other aspects of the subject technology may use other content creation interfaces.

Figure 17:
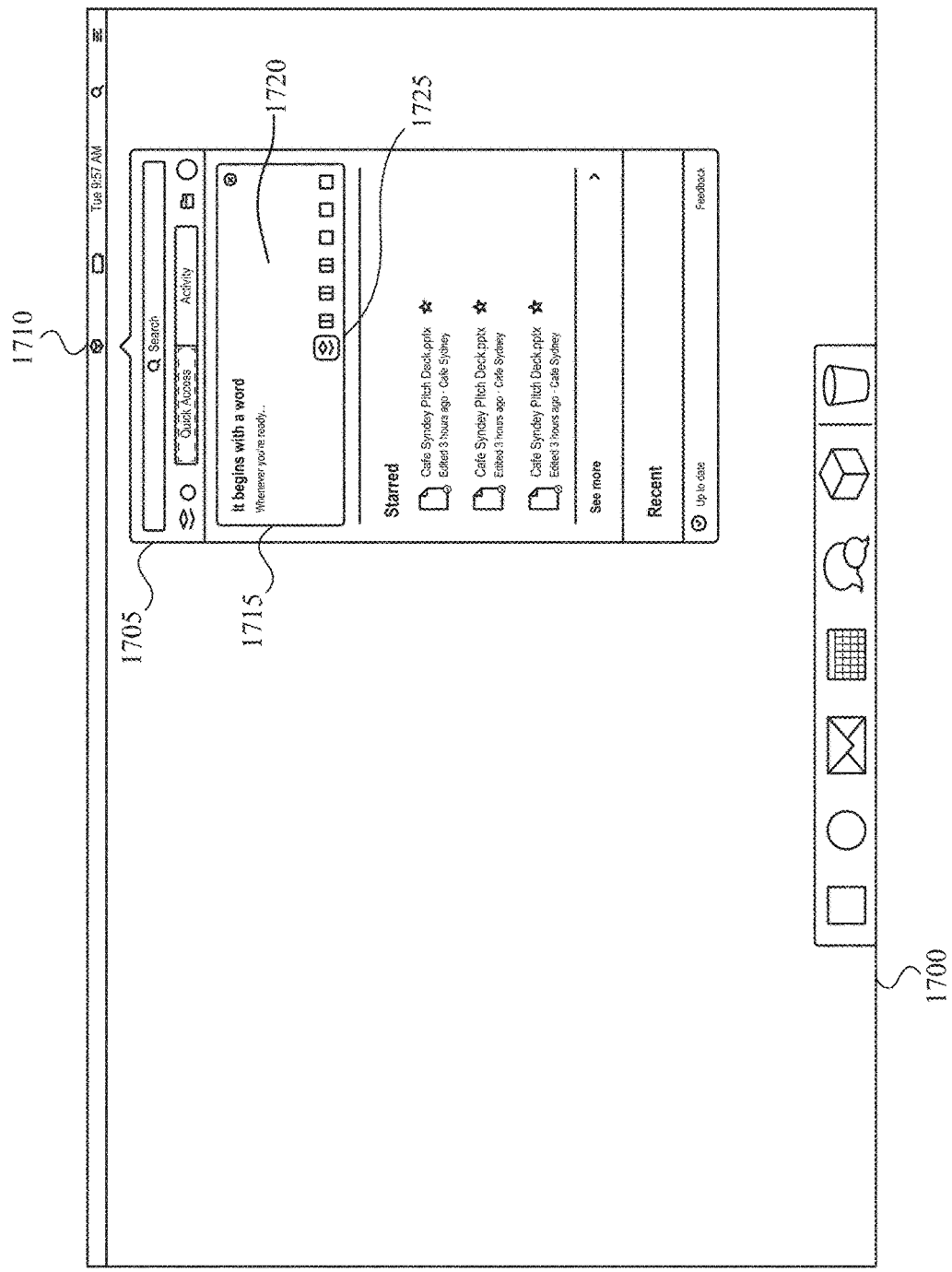
FIG. 17 shows an example graphical user interface including a content creation interface, in accordance with various embodiments of the subject technology.

FIG. 17 shows an example graphical user interface 1700 including a content creation interface 1715, in accordance with various embodiments of the subject technology. Graphical user interface 1700 includes window 1705 that is displayed in response to a user selection of interface element 1710 (e.g., an icon associated with a content management system). Window 1705 includes content creation interface 1715 where content items of different types can be created.

Various aspects of the subject technology are directed to further reducing the steps and delay a user experiences before beginning to create a content item. For example, content creation interface 1715 allows the user to begin creating the content within content field 1720 located in content creation interface 1715. For example, the user may begin typing, drawing, attaching or embedding content, or otherwise begin generating content for a new content item within content field 1720. The content generated in the content field 1720 may be temporarily stored on the client device and/or a content management system. To create the new content item, the user may select one of the content types 1725 listed in the content creation interface 1715. Upon selection of a content type from the list of content types 1725, the client device can initiate the creation of the content item of the selected type on the client device, the content management system, and/or third party service. The created content item may include the content provided in the content field 1720.

Figure 18:
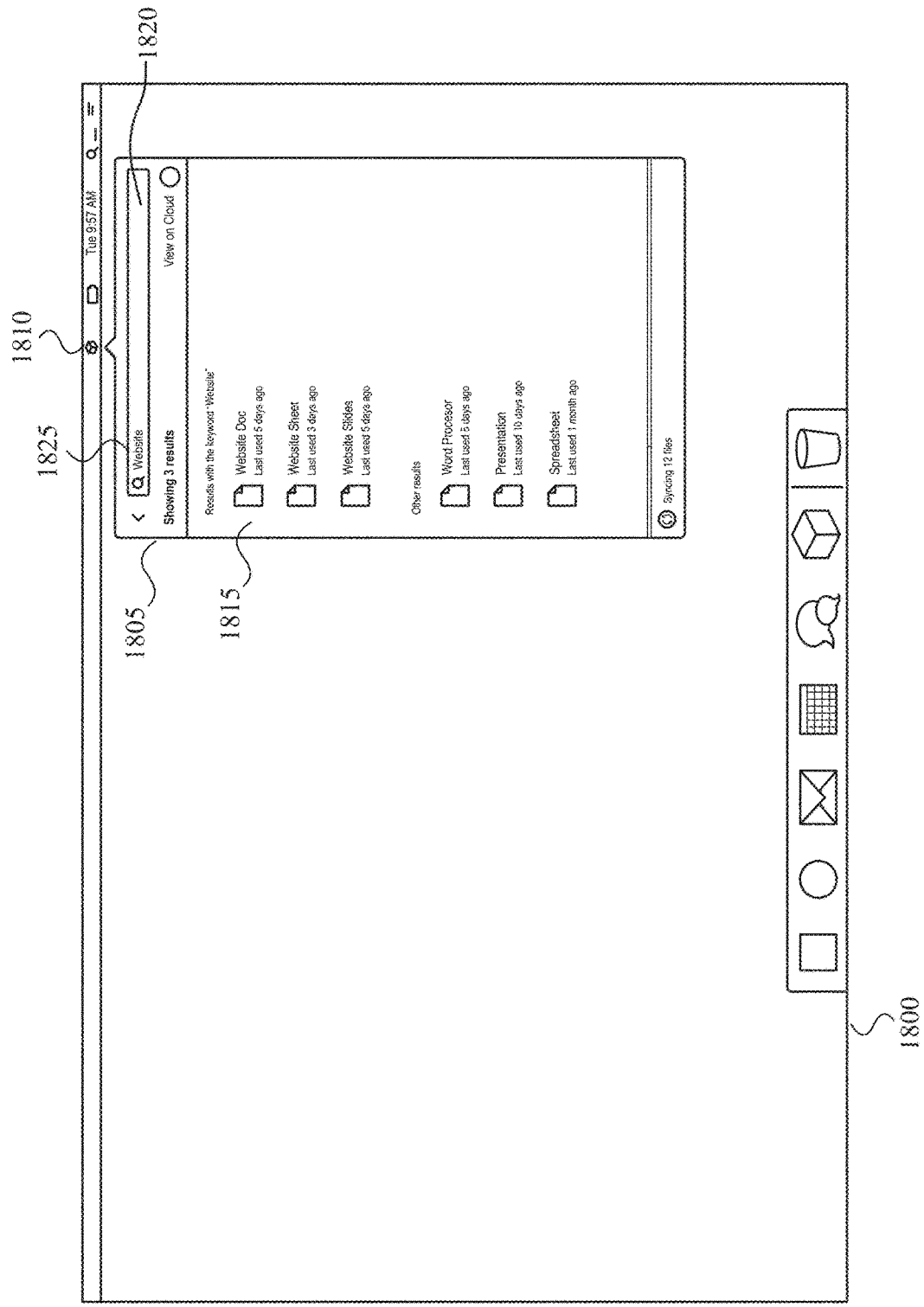
FIG. 18 shows an example graphical user interface including a content creation interface, in accordance with various embodiments of the subject technology.

FIG. 18 shows an example graphical user interface 1800 including a content creation interface 1815, in accordance with various embodiments of the subject technology. Graphical user interface 1800 includes window 1805 that is displayed in response to a user selection of interface element 1810 (e.g., an icon associated with a content management system). Window 1805 includes content creation interface 1815 where content items of different types can be created.

As noted above, there may be a large number of content item types that may be created. However, there may not be enough space to effectively display all of the content item types to the user without overwhelming the user. Accordingly, in some aspects of the subject technology, a subset of all the content item types may be selected based on various metrics, algorithms, and combinations of techniques (e.g., machine learning). Some aspects of the subject technology further allow a user to search for content item types to create. For example, window 1805 may include a search interface 1820 that allows a user to search for desired content items and/or content items to create. For example, the user can input search string 1825 and view a list of content item types that return as results for search string 1825. Content creation interface 1815 may also provide a list of other suggested content item types. The additional list of suggested content item types may be selected based on search string 1825, the list of search results, recently accessed content item types, frequently used content item types, or a combination of different metrics.

Figure 19:
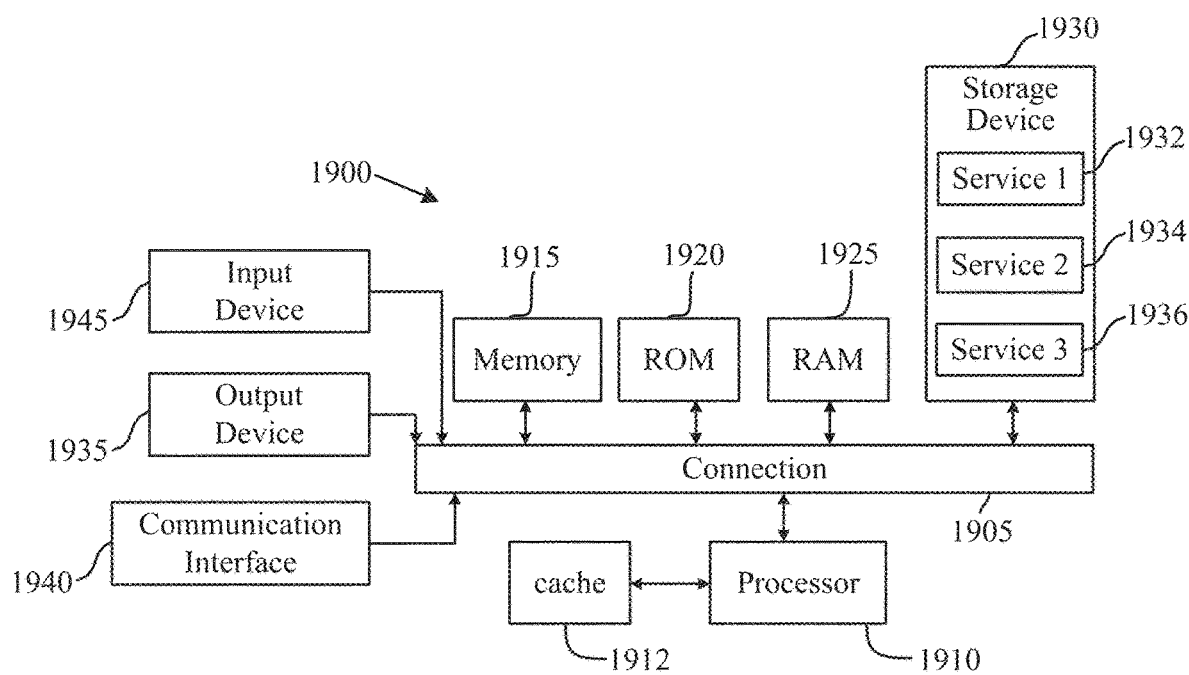
FIG. 19 shows an example system for implementing various aspects of the present technology.

FIG. 19 shows an example of computing system 1900, which can be for example any computing device making up client device 150, content management system 110 or any component thereof in which the components of the system are in communication with each other using connection

1905. Connection 1905 can be a physical connection via a bus, or a direct connection into processor 1910, such as in a chipset architecture. Connection 1905 can also be a virtual connection, networked connection, or logical connection.

In some embodiments, computing system 1900 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example computing system 1900 includes at least one processing unit (CPU or processor) 1910 and connection 1905 that couples various system components including system memory 1915, such as read only memory (ROM) 1920 and random access memory (RAM) 1925 to processor 1910. Computing system 1900 can include a cache of high-speed memory 1912 connected directly with, in close proximity to, or integrated as part of processor 1910.

Processor 1910 can include any general purpose processor and a hardware service or software service, such as services 1932, 1934, and 1936 stored in storage device 1930, configured to control processor 1910 as well as a special-purpose processor where software instructions are incorporated into the actual processor design. Processor 1910 may essentially be a completely self-contained computing system, containing multiple cores or processors, a bus, memory controller, cache, etc. A multi-core processor may be symmetric or asymmetric.

To enable user interaction, computing system 1900 includes an input device 1945, which can represent any number of input mechanisms, such as a microphone for speech, a touch-sensitive screen for gesture or graphical input, keyboard, mouse, motion input, speech, etc. Computing system 1900 can also include output device 1935, which can be one or more of a number of output mechanisms known to those of skill in the art. In some instances, multimodal systems can enable a user to provide multiple types of input/output to communicate with computing system 1900. Computing system 1900 can include communications interface 1940, which can generally govern and manage the user input and system output. There is no restriction on operating on any particular hardware arrangement and therefore the basic features here may easily be substituted for improved hardware or firmware arrangements as they are developed.

Storage device 1930 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 1930 can include software services, servers, services, etc., that when the code that defines such software is executed by the processor 1910, it causes the system to perform a function. In some embodiments, a hardware service that performs a particular function can include the software component stored in a computer-readable medium in connection with the necessary hardware components, such as processor 1910, connection 1905, output device 1935, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" refers to at least one of a set and indicates that one member of the set or multiple members of the set satisfy the claim. For example, claim language reciting "at least one of A and B" means A. B, or A and B.

What is claimed is:

1. A method comprising:
   receiving a user selection of an interface element located in a persistent user interface of an operating system desktop of a client device, wherein the persistent user interface is provided by a content management system client application for a content management system other than an external service;
   displaying, in response to the user selection of the interface element, a set of user options associated with the persistent user interface, the set of user options comprising a first option to create a first content item of a first type associated with an external service;
   receiving a user selection of the first option to create the first content item of the first type;
   storing a canonical content item for the first content item at the content management system other than the external service, wherein the canonical content item is stored at a location chosen by the user, wherein the canonical content item enables access to the first content item without storing complete contents of the first content item on the content management system, wherein the client device performs validity checks on a name for the first content item at the external service for the content item and the canonical content item at the content management system; and
   transmitting, to the external service, instructions to create the first content item having the name for the first content item of the first type.

2. The method of claim 1, further comprising receiving, from the external service, a notification that the first content item has been created.

3. The method of claim 1, wherein the external service is a content management system, the method further comprising synchronizing the first content item from the content management system to a file system on the client device.

4. The method of claim 1, wherein the set of user options further includes a second option to create a second content item of a second type associated with an application installed on the client device.

5. The method of claim 4, further comprising:
   receiving a user selection of the second option to create the second content item of the second type associated with the application installed on the client device;
   creating the second content item at a location on a file system of the client device; and
   opening the second content item via the application installed on the client device.

6. The method of claim 5, wherein the location on the file system of the client device is configured to be synchronized with a content management system, the method further comprising synchronizing the second content item on the file system of the client device to the content management system.

7. The method of claim 1, wherein the set of user options further includes a third option to open an existing content item.

8. The method of claim 1, further comprising identifying the set of user options based on at least one of most frequently used content item types, most recently used content item types, or user preferences.

9. The method of claim 1, further comprising opening the first content item of the first type.

10. The method of claim 9, further comprising identifying an associated application or service to open the first content item of the first type based on at least one of a registry stored on the client device or a request to a content management system for the associated application or service.

11. A computing device comprising:
   one or more processors; and
   at least one non-transitory computer-readable medium having stored therein instructions which, when executed by the one or more processors, cause the computing device to:
      receive a user selection of an interface element located in a persistent user interface of an operating system desktop of a client device, wherein the persistent user interface is provided by a content management system client application for a content management system other than an external service;
      display, in response to the user selection of the interface element, a content creation interface including a set of user options associated with the persistent user interface, the set of user options comprising an option to create a content item of a first type associated with an external service;
      receive a user selection of the option to create the content item;
      store a canonical content item for the first content item at the content management system other than the external service, wherein the canonical content item is stored at a location chosen by the user, wherein the canonical content item enables access to the first content item without storing complete contents of the first content item on the content management system, wherein the client device performs validity checks on a name for the first content item at the external service for the content item and the canonical content item at the content management system; and
      initiate creation of the content item having the name at the external service.

12. The computing device of claim 11, wherein the instructions further cause the computing device to synchronize a representation of the content item between the client device and the content management system.

13. The computing device of claim 11, wherein the set of user options further includes an option to open an existing content item.

14. The computing device of claim 11, wherein the instructions further cause the computing device to:
   receive a notification confirming the creation of the content item; and
   open, in response to the notification, the content item.

15. The computing device of claim 14, wherein the notification is received from the content management system.

16. A non-transitory computer-readable medium comprising instructions that, when executed by one or more processors, cause a computing device to:
   receive a user selection of an interface element located in a persistent user interface of an operating system desktop of a client device, wherein the persistent user interface is provided by a content management system client application for a content management system other than an external service;

display, in response to the user selection of the interface element, a set of user options associated with the persistent user interface, the set of user options comprising a first option to create a first content item of a first type associated with an external service and a second option to create a second content item of a second type;

receive a user selection of the first option to create the first content item of the first type associated with the external service;

receive a name for the first content item of the first type;

store a canonical content item for the first content item at the content management system other than the external service, wherein the canonical content item is stored at a location chosen by the user, wherein the canonical content item enables access to the first content item without storing complete contents of the first content item on the content management system, wherein the client device performs validity checks on the name for the first content item at the external service for the content item and the canonical content item at the content management system; and initiate creation of the first content item having the name for the first content item of the first type.

17. The non-transitory computer-readable medium of claim 16, wherein the first type is a cloud content item associated with the external service, and wherein the instructions further cause the computing device to transmit instructions to the external service to create the first content item.

18. The non-transitory computer-readable medium of claim 16, wherein the first type is associated with an application installed on the client device, and wherein the instructions further cause the computing device to create the first content item at a location on a file system of the client device.

* * * * *